United States Patent [19]

Davidson et al.

[11] Patent Number: 4,916,625

[45] Date of Patent: Apr. 10, 1990

[54] INFERENTIAL TIME-OPTIMIZED OPERATION OF A FIBER PRODUCING SPINNING MACHINE BY COMPUTERIZED KNOWLEDGE BASED SYSTEM

[75] Inventors: Scott L. Davidson, Seaford; Michael J. Piovoso, Newark; John J. Turner, Wilmington; Mark D. Wetzel, Bear, all of Del.

[73] Assignee: E. I. Du Pont de Nemours and Company, Wilmington, Del.

[21] Appl. No.: 241,994

[22] Filed: Sep. 8, 1988

[51] Int. Cl.⁴ ..................... G06F 15/46; H03K 21/40; D01H 13/00

[52] U.S. Cl. .................................... 364/470; 364/143; 57/264

[58] Field of Search ................... 57/264, 265; 364/470, 364/143

[56] References Cited

U.S. PATENT DOCUMENTS

| | | | |
|---|---|---|---|
| 4,408,447 | 10/1983 | Sloupensky et al. | 364/470 X |
| 4,534,042 | 8/1985 | Marsicek et al. | 364/470 X |
| 4,656,465 | 4/1987 | Erni et al. | 340/679 |
| 4,675,829 | 6/1987 | Clemenson | 364/513 |

Primary Examiner—Clark A. Jablon

[57] ABSTRACT

A method for monitoring the operation of a multiposition spinning machine wherein filaments are extruded from a spinning pack at each position and advanced as a yarn bundle in a path, then split at a location into a plurality of threadlines to be forwarded to a plurality of windups to be wound on packages and scheduling events at predetermined times in the preparation of said packages with the aid of a digital computer, the method relies on a program with a knowledge database that includes the operative state of each position, the elapsed time since the initiation of each package, predetermined event times unique to the filaments being wound, the positional configuration of said machine, a hueristic rule base. The operative state of each position is sensed by monitoring the presence or absence of the advancing yarn bundle and threadlines as a function of time and this information is provided to the computer which compares the operative state of each position and the elapsed time since initiation of each package and indicates that the time for performing said events has been reached.

4 Claims, 36 Drawing Sheets

I/O SUBSYSTEM SENSOR SCANNING FLOW DIAGRAM

FACT BASE OBJECT HIERARCHY

FIG. 8

SM.POSITIONS CLASS SLOT LIST

```
((UNIT SM.POSITIONS IN THE TODS-FACT-BASE KNOWLEDGE BASE)
 (COMMENT "Spinning Machine Winding Positions")
 (MEMBERSLOTS
   (BREAK.SENSOR (VALUE NIL)
           (VALUECLASS ((ONE.OF OFF OFF.TO.ON ON.TO.OFF ON))))
   (BREAK.SENSOR.CONDITION (VALUE (GOOD))
              (VALUECLASS ((ONE.OF GOOD BAD))))
   (BREAK.SENSOR.INPUT (VALUE (OFF))
           (VALUECLASS ((ONE.OF OFF ON)))
            (AVUNITS (#[Unit: TODS-BREAK-SENSOR-AV TODS-METHODS])))
   (BREAK.SENSOR.STATE (VALUE NIL)
              (VALUECLASS ((ONE.OF SPINNING BREAK))))
   (BREAK.SENSOR.TIMER (VALUE (STOP))
      (VALUECLASS ((ONE.OF STOP START RUNNING TIMEOUT)))
       (AVUNITS (#[Unit: TODS-BREAK-SENSOR-TIMER-STATE-CHANGE-AV TODS-METHODS])))
   (BREAK.SENSOR.TIMER.INTERVAL (VALUE (10)))
   (BREAK.SENSOR.TIMER.METHOD
       (VALUE (BREAK-SENSOR-TIMER-STATE-CHANGE-METHOD)))
   (BREAK.SENSOR.TIMER.TIMEOUT (VALUE (0)))

(DOFF.TIMER (VALUE (STOP))
         (VALUECLASS ((ONE.OF STOP START RUNNING TIMEOUT)))
           (AVUNITS (#[Unit: TODS-DOFF-TIMER-STATE-CHANGE-AV TODS-METHODS])))
   (DOFF.TIMER.INTERVAL (VALUE (600)))
   (DOFF.TIMER.METHOD (VALUE (DOFF-TIMER-STATE-CHANGE-METHOD)))
   (DOFF.TIMER.TIMEOUT (VALUE (0)))
   (DOFF.TYPE (VALUE (REG))
          (VALUECLASS ((ONE.OF PACK REG WIPE))))

(EFFICIENCY (VALUE (1.0)))

(ELAPSED.TIME (VALUE (0.0)))

(ELAPSED.TIMER (VALUE (STOP))
          (VALUECLASS ((ONE.OF STOP START RUNNING TIMEOUT)))
           (AVUNITS (#[Unit: TODS-ELAPSED-TIMER-STATE-CHANGE-AV TODS-METHODS])))
   (ELAPSED.TIMER.INTERVAL (VALUE (10)))
   (ELAPSED.TIMER.METHOD (VALUE (ELAPSED-TIMER-STATE-CHANGE-METHOD)))
   (ELAPSED.TIMER.TIMEOUT (VALUE NIL))
```

FIG. 8 (Continued)

```
(LAST.PACK (VALUE NIL))

(LAST.STATE (VALUE (OFF)))
 (VALUECLASS ((ONE.OF OFF START DOFF DOWN RUN))))

(LAST.WIPE (VALUE NIL))

(LOG.REC.NUMBER (VALUE (0)))

(LWU.SENSOR (VALUE (OFF))
       (VALUECLASS ((ONE.OF OFF OFF.TO.ON ON.TO.OFF ON))))
 (LWU.SENSOR.CONDITION (VALUE (GOOD))
         (VALUECLASS ((ONE.OF GOOD BAD))))
 (LWU.SENSOR.INPUT (VALUE NIL)
       (VALUECLASS ((ONE.OF OFF ON)))
       (AVUNITS (#[Unit: TODS-LWU-SENSOR-AV TODS-METHODS])))
 (LWU.SENSOR.STATE (VALUE NIL)
       (VALUECLASS ((ONE.OF CUT.IN DOFF.COMPLETE WINDING))))
 (LWU.SENSOR.TIMER (VALUE (STOP))
   (VALUECLASS ((ONE.OF STOP START RUNNING TIMEOUT)))
   (AVUNITS (#[Unit: TODS-LWU-SENSOR-TIMER-STATE-CHANGE-AV TODS-METHODS])))
 (LWU.SENSOR.TIMER.INTERVAL (VALUE (10)))
 (LWU.SENSOR.TIMER.METHOD (VALUE (LWU-SENSOR-TIMER-STATE-CHANGE-METHOD)))
 (LWU.SENSOR.TIMER.TIMEOUT (VALUE (0)))
 (LWU.START.TIMER (VALUE (STOP))
        (VALUECLASS ((ONE.OF STOP START RUNNING TIMEOUT)))
        (AVUNITS (#[Unit: TODS-START-TIMER-STATE-CHANGE-AV TODS-METHODS])))
 (LWU.START.TIMER.INTERVAL (VALUE (0)))
 (LWU.START.TIMER.METHOD (VALUE (LWU-START-TIMER-STATE-CHANGE-METHOD)))
 (LWU.START.TIMER.TIMEOUT (VALUE (0)))

(NEEDS (VALUE (NO-SERVICE))
  (VALUECLASS ((ONE.OF NO-SERVICE DOFF-SERVICE MAINTENANCE))))

(OVERSPIN.TIMER (VALUE (STOP))
      (VALUECLASS ((ONE.OF STOP START RUNNING TIMEOUT)))
        (AVUNITS (#[Unit: TODS-OVERSPIN-TIMER-STATE-CHANGE-AV TODS-METHODS])))
 (OVERSPIN.TIMER.INTERVAL (VALUE (0)))
 (OVERSPIN.TIMER.METHOD (VALUE (OVERSPIN-TIMER-STATE-CHANGE-METHOD)))
 (OVERSPIN.TIMER.TIMEOUT (VALUE (0)))
```

FIG. 8 (Continued)

```
(PACK.TIME.REMAINING (VALUE (0)))
(PACK.TIMER (VALUE (STOP))
        (VALUECLASS ((ONE.OF STOP START RUNNING TIMEOUT)))
           (AVUNITS (#[Unit: TODS-PACK-TIMER-STATE-CHANGE-AV TODS-METHODS])))
(PACK.TIMER.INTERVAL (VALUE (0)))
(PACK.TIMER.METHOD (VALUE (PACK-TIMER-STATE-CHANGE-METHOD)))
(PACK.TIMER.TIMEOUT (VALUE (0)))

(PACKAGE.SIZE (VALUE NIL))

(POSITION.NAME (VALUE NIL)
  (VALUECLASS ((MEMBER.OF #[Unit: SM.POSITIONS TODS-FACT-BASE]))))
(POSITION.NUMBER (VALUE (0)))

(RWU.SENSOR (VALUE (OFF))
        (VALUECLASS ((ONE.OF OFF OFF.TO.ON ON.TO.OFF ON))))
(RWU.SENSOR.CONDITION (VALUE (GOOD))
           (VALUECLASS ((ONE.OF GOOD BAD))))
(RWU.SENSOR.INPUT (VALUE NIL)
           (VALUECLASS ((ONE.OF OFF ON)))
             (AVUNITS (#[Unit: TODS-RWU-SENSOR-AV TODS-METHODS])))
(RWU.SENSOR.STATE (VALUE NIL)
           (VALUECLASS ((ONE.OF CUT.IN DOFF.COMPLETE WINDING))))
(RWU.SENSOR.TIMER (VALUE NIL)
  (VALUECLASS ((ONE.OF STOP START RUNNING TIMEOUT)))
   (AVUNITS (#[Unit: TODS-RWU-SENSOR-TIMER-STATE-CHANGE-AV TODS-METHODS])))
(RWU.SENSOR.TIMER.INTERVAL (VALUE (10)))
(RWU.SENSOR.TIMER.METHOD (VALUE (RWU-SENSOR-TIMER-STATE-CHANGE-METHOD)))
(RWU.SENSOR.TIMER.TIMEOUT (VALUE (0)))
(RWU.START.TIMER (VALUE (STOP))
         (VALUECLASS ((ONE.OF STOP START RUNNING TIMEOUT)))
           (AVUNITS (#[Unit: TODS-START-TIMER-STATE-CHANGE-AV TODS-METHODS])))
(RWU.START.TIMER.INTERVAL (VALUE (0)))
(RWU.START.TIMER.METHOD (VALUE (RWU-START-TIMER-STATE-CHANGE-METHOD)))
(RWU.START.TIMER.TIMEOUT (VALUE (0)))

(SIM.BREAK.TIMER (VALUE (STOP))
         (VALUECLASS ((ONE.OF STOP START RUNNING TIMEOUT)))
           (AVUNITS (#[Unit: TODS-SIM-BREAK-TIMER-STATE-CHANGE-AV TODS-METHODS])))
(SIM.BREAK.TIMER.INTERVAL (VALUE (0)))
(SIM.BREAK.TIMER.METHOD (VALUE (SIM-BREAK-TIMER-STATE-CHANGE-METHOD)))
(SIM.BREAK.TIMER.TIMEOUT (VALUE (0)))
```

FIG. 8 (Continued)

```
(SM (VALUE (0)))
(SM.NAME (VALUE NIL)
 (VALUECLASS ((MEMBER.OF #[Unit: SPINNING.MACHINES TODS-FACT-BASE]))))

(SMO.STATUS (VALUE (IDLE))
 (VALUECLASS ((ONE.OF IDLE DONE MAINTENANCE WAITING WORKING))))

(START.TIME (VALUE (0.0)))

(STATE (VALUE NIL)
    (VALUECLASS ((ONE.OF OFF START DOFF DOWN RUN))))

(STOP.TIME (VALUE (0.0)))
(TIME.REMAINING (VALUE (0)))

(WIPE.TIME.REMAINING (VALUE (0)))
(WIPE.TIMER (VALUE (STOP))
      (VALUECLASS ((ONE.OF STOP START RUNNING TIMEOUT)))
       (AVUNITS (#[Unit: TODS-WIPE-TIMER-STATE-CHANGE-AV TODS-METHODS])))
(WIPE.TIMER.INTERVAL (VALUE (0)))
(WIPE.TIMER.METHOD (VALUE (WIPE-TIMER-STATE-CHANGE-METHOD)))
(WIPE.TIMER.TIMEOUT (VALUE (0)))

(OWNSLOTS
 (CURRENT.POSITION (VALUE (#[Unit: SM.11.POS.1 TODS-FACT-BASE]))
      (VALUECLASS ((MEMBER.OF #[Unit: SM.POSITIONS TODS-FACT-BASE]))))
 (CURRENT.SM (VALUE (#[Unit: SM.11 TODS-FACT-BASE]))
      (VALUECLASS ((MEMBER.OF #[Unit: SPINNING.MACHINES TODS-FACT-BASE]))))

(DISPLAY.POSITION (VALUE (1))
      (AVUNITS (#[Unit: TODS-GET-NEW-POSITION-AV TODS-METHODS])))
 (DISPLAY.SM (VALUE (11))
      (AVUNITS (#[Unit: TODS-GET-NEW-SM-AV TODS-METHODS])))))
```

SENSOR STATE DIAGRAM

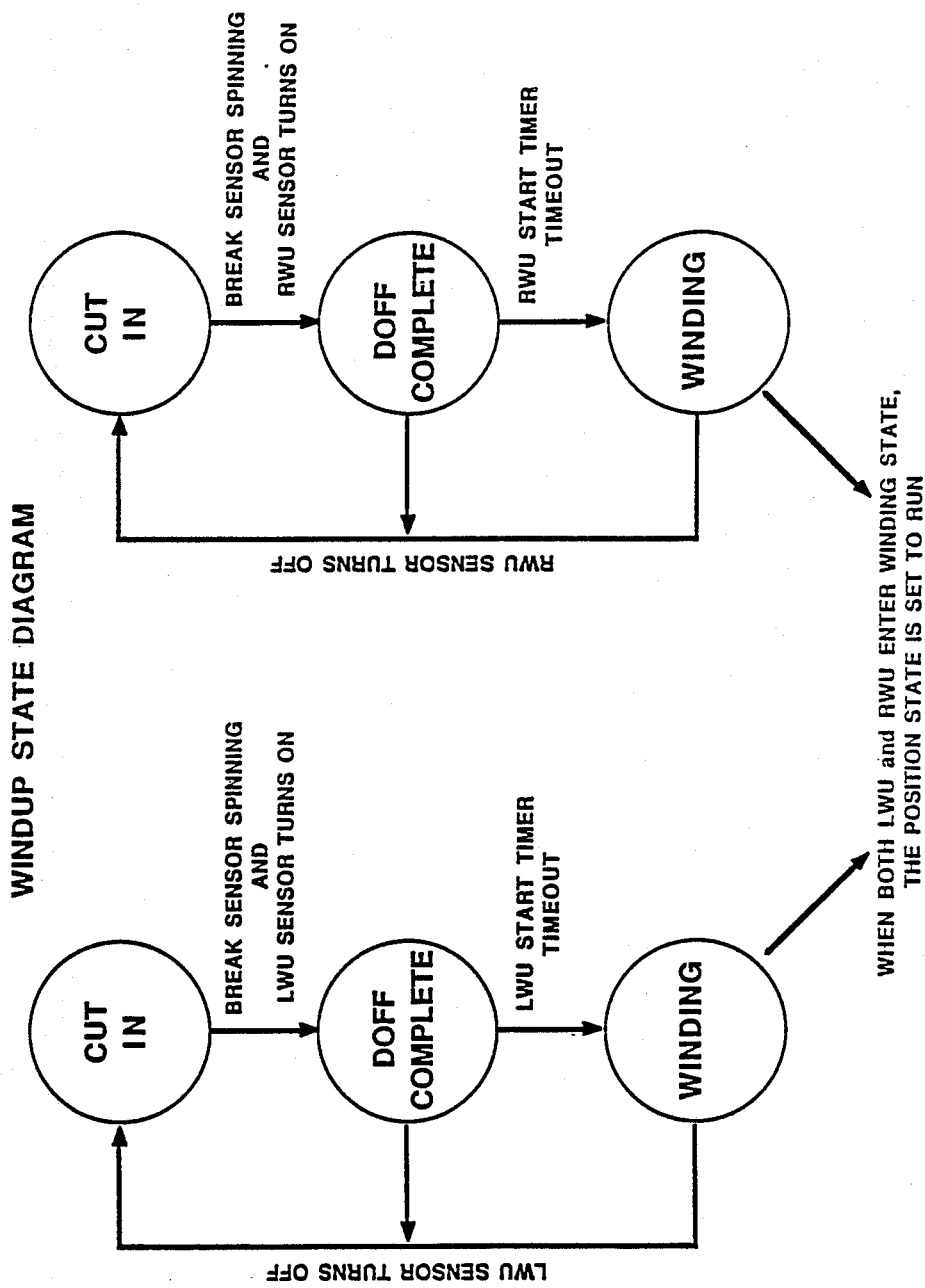

POSITION STATE DIAGRAM

SMO STATE DIAGRAM

FIG. 9B

SM.OPERATORS CLASS SLOT LIST

```
((UNIT SM.OPERATORS IN THE TODS-FACT-BASE KNOWLEDGE BASE)
 (COMMENT "Spinning Machine Operators who are Assigned BY TEAM number")
 (MEMBERSLOTS
  (ACKNOWLEDGE.TIMER (VALUE NIL))
   (VALUECLASS ((ONE.OF STOP START RUNNING TIMEOUT)))
   (AVUNITS (#[Unit: TODS-ACKNOWLEDGE-TIMER-STATE-CHANGE-AV TODS-METHODS])))
  (ACKNOWLEDGE.TIMER.INTERVAL (VALUE (0)))
  (ACKNOWLEDGE.TIMER.METHOD
      (VALUE (ACKNOWLEDGE-TIMER-STATE-CHANGE-METHOD)))
  (ACKNOWLEDGE.TIMER.TIMEOUT (VALUE NIL))

(ASSIGNMENT (VALUE NIL)
      (VALUECLASS ((ONE.OF ACKNOWLEDGED MAINTENANCE DOFF IDLE GET-READY))))

(EFFICIENCY (VALUE (1.0)))

(IDLE.TIME (VALUE (0.0)))

(LAST.STATE (VALUE NIL)
       (VALUECLASS ((ONE.OF IDLE OFF.SITE ON.BREAK WORKING))))
  (ON.BREAK.TIME (VALUE (0.0)))

(POSITION (VALUE NIL)
      (VALUECLASS ((MEMBER.OF #[Unit: SM.POSITIONS TODS-FACT-BASE]))))

(SIMULATION.TIME (VALUE (0.0)))
  (SIMULATOR.STATE (VALUE NIL)
           (VALUECLASS ((ONE.OF SIM.ACK
                SIM.BRK.SU
                SIM.DOFF.DONE
                SIM.IDLE
                SIM.LWU.CUT.IN
                SIM.LWU.DOFF.COMPLETE
                SIM.LWU.SU
                SIM.PACK
                SIM.RWU.CUT.IN
                SIM.RWU.DOFF.COMPLETE
                SIM.RWU.SU
                SIM.WIPE))))
```

FIG. 9B (Continued)

```
(SM (VALUE NIL)
     (VALUECLASS ((MEMBER.OF #[Unit: SPINNING.MACHINES TODS-FACT-BASE]))))

(SMO.SIM.TIMER (VALUE NIL)
       (VALUECLASS ((ONE.OF STOP START RUNNING TIMEOUT)))
         (AVUNITS (#[Unit: TODS-SMO-SIM-TIMER-STATE-CHANGE-AV TODS-METHODS])))
(SMO.SIM.TIMER.INTERVAL (VALUE (0)))
(SMO.SIM.TIMER.METHOD (VALUE (TODS-SMO-SIM-TIMER-METHOD)))
(SMO.SIM.TIMER.TIMEOUT (VALUE NIL))

(STATE (VALUE (IDLE))
      (VALUECLASS ((ONE.OF IDLE OFF.SITE ON.BREAK WORKING))))

(TEAM (VALUE NIL)
      (VALUECLASS ((MEMBER.OF #[Unit: SMO.TEAMS TODS-FACT-BASE]))))

(TIME (VALUE NIL))

(TIMER.TIMED.OUT (VALUE NIL))

(WORKING.TIME (VALUE (0.0)))

(OWNSLOTS
 (CURRENT.SMO (VALUE NIL)
     (VALUECLASS ((MEMBER.OF #[Unit: SM.OPERATORS TODS-FACT-BASE])))))
```

POSITION RULES HIERARCHY

SMO RULES
AND
SM RULES
HIERARCHY

FIG. 12

;;; POSITION.SENSOR.IO.RULES Rule Set LISP Forms:

((BREAK.SENSOR.OFF (IF (THE CURRENT.POSITION OF SM.POSITIONS IS ?POSITION)
            (THE TIMER.TIMED.OUT OF ?POSITION IS BREAK.SENSOR.TIMER)
            (THE BREAK.SENSOR.INPUT OF ?POSITION IS OFF)
        THEN
            (CHANGE.TO (THE BREAK.SENSOR OF ?POSITION IS OFF))))

(BREAK.SENSOR.OFF.TO.ON (IF
            (THE CURRENT.POSITION OF SM.POSITIONS IS ?POSITION)
            (THE BREAK.SENSOR OF ?POSITION IS OFF.TO.ON)
        THEN
            (CHANGE.TO (THE BREAK.SENSOR.TIMER OF ?POSITION IS START))))

(BREAK.SENSOR.ON (IF (THE CURRENT.POSITION OF SM.POSITIONS IS ?POSITION)
            (THE TIMER.TIMED.OUT OF ?POSITION IS BREAK.SENSOR.TIMER)
            (THE BREAK.SENSOR.INPUT OF ?POSITION IS ON)
        THEN
            (CHANGE.TO (THE BREAK.SENSOR OF ?POSITION IS ON))))

(BREAK.SENSOR.ON.TO.OFF (IF
            (THE CURRENT.POSITION OF SM.POSITIONS IS ?POSITION)
            (THE BREAK.SENSOR OF ?POSITION IS ON.TO.OFF)
        THEN
            (CHANGE.TO (THE BREAK.SENSOR.TIMER OF ?POSITION IS START))))

(LWU.SENSOR.OFF (IF (THE CURRENT.POSITION OF SM.POSITIONS IS ?POSITION)
            (THE TIMER.TIMED.OUT OF ?POSITION IS LWU.SENSOR.TIMER)
            (THE LWU.SENSOR.INPUT OF ?POSITION IS OFF)
        THEN
            (CHANGE.TO (THE LWU.SENSOR OF ?POSITION IS OFF))))

(LWU.SENSOR.OFF.TO.ON (IF (THE CURRENT.POSITION OF SM.POSITIONS IS ?POSITION)
            (THE LWU.SENSOR OF ?POSITION IS OFF.TO.ON)
        THEN
            (CHANGE.TO (THE LWU.SENSOR.TIMER OF ?POSITION IS START))))

(LWU.SENSOR.ON (IF (THE CURRENT.POSITION OF SM.POSITIONS IS ?POSITION)
            (THE TIMER.TIMED.OUT OF ?POSITION IS LWU.SENSOR.TIMER)
            (THE LWU.SENSOR.INPUT OF ?POSITION IS ON)
        THEN
            (CHANGE.TO (THE LWU.SENSOR.TIMER OF ?POSITION IS STOP))
            (CHANGE.TO (THE LWU.SENSOR OF ?POSITION IS ON))))

FIG. 12 (Continued)

```
(LWU.SENSOR.ON.TO.OFF (IF (THE CURRENT.POSITION OF SM.POSITIONS IS ?POSITION)
            (THE LWU.SENSOR OF ?POSITION IS ON.TO.OFF)
        THEN
            (CHANGE.TO (THE LWU.SENSOR.TIMER OF ?POSITION IS START))))

(RWU.SENSOR.OFF (IF (THE CURRENT.POSITION OF SM.POSITIONS IS ?POSITION)
            (THE TIMER.TIMED.OUT OF ?POSITION IS RWU.SENSOR.TIMER)
            (THE RWU.SENSOR.INPUT OF ?POSITION IS OFF)
        THEN
            (CHANGE.TO (THE RWU.SENSOR OF ?POSITION IS OFF))))

(RWU.SENSOR.OFF.TO.ON (IF (THE CURRENT.POSITION OF SM.POSITIONS IS ?POSITION)
            (THE RWU.SENSOR OF ?POSITION IS OFF.TO.ON)
        THEN
            (CHANGE.TO (THE RWU.SENSOR.TIMER OF ?POSITION IS START))))

(RWU.SENSOR.ON (IF (THE CURRENT.POSITION OF SM.POSITIONS IS ?POSITION)
            (THE TIMER.TIMED.OUT OF ?POSITION IS RWU.SENSOR.TIMER)
            (THE RWU.SENSOR.INPUT OF ?POSITION IS ON)
        THEN
            (CHANGE.TO (THE RWU.SENSOR OF ?POSITION IS ON))))

(RWU.SENSOR.ON.TO.OFF (IF (THE CURRENT.POSITION OF SM.POSITIONS IS ?POSITION)
            (THE RWU.SENSOR OF ?POSITION IS ON.TO.OFF)
        THEN
            (CHANGE.TO (THE RWU.SENSOR.TIMER OF ?POSITION IS START)))))
```

FIG. 12A

```
;;; POSITION.SENSOR.STATE.RULES Rule Set LISP Forms:

((BREAK.SENSOR.BREAK (IF (THE CURRENT.POSITION OF SM.POSITIONS IS ?POSITION)
            (OR (AND (THE BREAK.SENSOR.CONDITION OF ?POSITION IS GOOD)
                 (THE BREAK.SENSOR OF ?POSITION IS OFF))
              (AND (THE BREAK.SENSOR.CONDITION OF ?POSITION IS BAD)
                 (THE LWU.SENSOR OF ?POSITION IS OFF)
                 (THE RWU.SENSOR OF ?POSITION IS OFF)))
            (CANT.FIND (THE BREAK.SENSOR.STATE OF ?POSITION IS BREAK))
           THEN
             (CHANGE.TO (THE BREAK.SENSOR.STATE OF ?POSITION IS BREAK))))

(BREAK.SENSOR.SPINNING (IF (THE CURRENT.POSITION OF SM.POSITIONS IS ?POSITION)
            (OR (AND (THE BREAK.SENSOR.CONDITION OF ?POSITION IS GOOD)
                 (THE BREAK.SENSOR OF ?POSITION IS ON))
              (AND (THE BREAK.SENSOR.CONDITION OF ?POSITION IS BAD)
                 (THE LWU.SENSOR OF ?POSITION IS ON)
                 (THE RWU.SENSOR OF ?POSITION IS ON)))
            (CANT.FIND (THE BREAK.SENSOR.STATE OF ?POSITION IS SPINNING))
           THEN
             (CHANGE.TO (THE BREAK.SENSOR.STATE OF ?POSITION IS SPINNING))))

(LWU.CUT.IN (IF (THE CURRENT.POSITION OF SM.POSITIONS IS ?POSITION)
         (THE LWU.SENSOR.CONDITION OF ?POSITION IS GOOD)
         (THE LWU.SENSOR OF ?POSITION IS OFF)
         (CANT.FIND (THE LWU.SENSOR.STATE OF ?POSITION IS CUT.IN))
        THEN
         (CHANGE.TO (THE LWU.START.TIMER OF ?POSITION IS STOP))
         (CHANGE.TO (THE LWU.SENSOR.STATE OF ?POSITION IS CUT.IN))))

(LWU.DOFF.COMPLETE (IF (THE CURRENT.POSITION OF SM.POSITIONS IS ?POSITION)
            (THE LWU.SENSOR.CONDITION OF ?POSITION IS GOOD)
            (THE LWU.SENSOR OF ?POSITION IS ON)
            (THE LWU.SENSOR.STATE OF ?POSITION IS CUT.IN)
            (THE SYSTEM-CURRENT-TIME-VALUE OF CLOCK-VALUES IS ?TIME)
           THEN
            (CHANGE.TO (THE START.TIME OF ?POSITION IS ?TIME))
            (CHANGE.TO (THE STOP.TIME OF ?POSITION IS ?TIME))
            (CHANGE.TO (THE LWU.START.TIMER OF ?POSITION IS START))
            (CHANGE.TO (THE LWU.SENSOR.STATE OF ?POSITION IS DOFF.COMPLETE))))
```

FIG. 12A (Continued)

```
(LWU.WINDING (IF (THE CURRENT.POSITION OF SM.POSITIONS IS ?POSITION)
        (THE TIMER.TIMED.OUT OF ?POSITION IS LWU.START.TIMER)
        (THE LWU.SENSOR.STATE OF ?POSITION IS DOFF.COMPLETE)
    THEN
        (CHANGE.TO (THE LWU.SENSOR.STATE OF ?POSITION IS WINDING))))

(RWU.CUT.IN (IF (THE CURRENT.POSITION OF SM.POSITIONS IS ?POSITION)
        (THE RWU.SENSOR.CONDITION OF ?POSITION IS GOOD)
        (THE RWU.SENSOR OF ?POSITION IS OFF)
        (CANT.FIND (THE RWU.SENSOR.STATE OF ?POSITION IS CUT.IN))
    THEN
        (CHANGE.TO (THE RWU.START.TIMER OF ?POSITION IS STOP))
        (CHANGE.TO (THE RWU.SENSOR.STATE OF ?POSITION IS CUT.IN))))

(RWU.DOFF.COMPLETE (IF (THE CURRENT.POSITION OF SM.POSITIONS IS ?POSITION)
        (THE RWU.SENSOR.CONDITION OF ?POSITION IS GOOD)
        (THE RWU.SENSOR OF ?POSITION IS ON)
        (THE RWU.SENSOR.STATE OF ?POSITION IS CUT.IN)
    THEN
        (CHANGE.TO (THE RWU.START.TIMER OF ?POSITION IS START))
        (CHANGE.TO (THE RWU.SENSOR.STATE OF ?POSITION IS DOFF.COMPLETE))))

(RWU.WINDING (IF (THE CURRENT.POSITION OF SM.POSITIONS IS ?POSITION)
        (THE TIMER.TIMED.OUT OF ?POSITION IS RWU.START.TIMER)
        (THE RWU.SENSOR.STATE OF ?POSITION IS DOFF.COMPLETE)
    THEN
        (CHANGE.TO (THE RWU.SENSOR.STATE OF ?POSITION IS WINDING)))))
```

FIG. 12B

;;; POSITION.SENSOR.VALIDATION.RULES Rule Set LISP Forms:

```
((BAD.SENSOR.ALERT (IF (THE CURRENT.POSITION OF SM.POSITIONS IS ?POSITION)
            (CANT.FIND (THE NEEDS OF ?POSITION IS MAINTENANCE))
            (OR (THE RWU.SENSOR.CONDITION OF ?POSITION IS BAD)
               (THE LWU.SENSOR.CONDITION OF ?POSITION IS BAD)
               (THE BREAK.SENSOR.CONDITION OF ?POSITION IS BAD))
          THEN
              (LISP (UNITMSG 'TODS.METHODS 'BAD-SENSOR-ALERT ?POSITION))))

(BREAK.SENSOR.BAD.OFF (IF (THE CURRENT.POSITION OF SM.POSITIONS IS ?POSITION)
            (THE TIMER.TIMED.OUT OF ?POSITION IS RWU.START.TIMER)
            (THE LWU.SENSOR OF ?POSITION IS ON)
            (THE RWU.SENSOR OF ?POSITION IS ON)
            (THE BREAK.SENSOR OF ?POSITION IS OFF)
          THEN
              (CHANGE.TO (THE BREAK.SENSOR.CONDITION OF ?POSITION IS BAD))))

(BREAK.SENSOR.BAD.ON (IF (THE CURRENT.POSITION OF SM.POSITIONS IS ?POSITION)
            (THE TIMER.TIMED.OUT OF ?POSITION IS SENSOR.CHANGE.TIMER)
            (THE BREAK.SENSOR OF ?POSITION IS ON)
          THEN
              (CHANGE.TO (THE BREAK.SENSOR.CONDITION OF ?POSITION IS BAD))))

(LWU.SENSOR.BAD.OFF (IF (THE CURRENT.POSITION OF SM.POSITIONS IS ?POSITION)
            (THE TIMER.TIMED.OUT OF ?POSITION IS LWU.START.TIMER)
            (THE LWU.SENSOR OF ?POSITION IS OFF)
          THEN
              (CHANGE.TO (THE LWU.SENSOR.CONDITION OF ?POSITION IS BAD))))

(LWU.SENSOR.BAD.ON (IF (THE CURRENT.POSITION OF SM.POSITIONS IS ?POSITION)
            (THE TIMER.TIMED.OUT OF ?POSITION IS OVERSPIN.TIMER)
            (THE LWU.SENSOR OF ?POSITION IS ON)
          THEN
              (CHANGE.TO (THE LWU.SENSOR.CONDITION OF ?POSITION IS BAD))))
```

FIG. 12B (Continued)

```
(RWU.SENSOR.BAD.OFF (IF (THE CURRENT.POSITION OF SM.POSITIONS IS ?POSITION)
                        (THE TIMER.TIMED.OUT OF ?POSITION IS RWU.START.TIMER)
                        (THE RWU.SENSOR OF ?POSITION IS OFF)
                    THEN
                        (CHANGE.TO (THE RWU.SENSOR.CONDITION OF ?POSITION IS BAD))))

(RWU.SENSOR.BAD.ON (IF (THE CURRENT.POSITION OF SM.POSITIONS IS ?POSITION)
                       (THE TIMER.TIMED.OUT OF ?POSITION IS OVERSPIN.TIMER)
                       (THE RWU.SENSOR OF ?POSITION IS ON)
                   THEN
                       (CHANGE.TO (THE RWU.SENSOR.CONDITION OF ?POSITION IS BAD)))))
```

FIG. 13

```
;;; POSITION.STATE.RULES Rule Set LISP Forms:

((BAD.SENSOR.STATE.CHANGE (IF
          (THE CURRENT.POSITION OF SM.POSITIONS IS ?POSITION)
          (OR (THE LWU.SENSOR.CONDITION OF ?POSITION IS BAD)
              (THE RWU.SENSOR.CONDITION OF ?POSITION IS BAD))
          (CANT.FIND (OR (THE STATE OF ?POSITION IS START)
                         (THE STATE OF ?POSITION IS OFF)))
        THEN
          (CHANGE.TO (THE STATE OF ?POSITION IS START))
          (CHANGE.TO (THE NEEDS OF ?POSITION IS MAINTENANCE))))

(POS.OUT.OF.RUN.STATE (IF (THE CURRENT.POSITION OF SM.POSITIONS IS ?POSITION)
              (THE SYSTEM-CURRENT-TIME-VALUE OF CLOCK-VALUES IS ?TIME)
              (CANT.FIND (THE STATE OF ?POSITION IS RUN))
              (THE LAST.STATE OF ?POSITION IS RUN)
         THEN
              (CHANGE.TO (THE STOP.TIME OF ?POSITION IS ?TIME))
              (LISP (UNITMSG 'TODS.METHODS 'WRITE-NEW-LOG-RECORD ?POSITION))))

(POS.STATE.CHANGE (IF (THE CURRENT.POSITION OF SM.POSITIONS IS ?POSITION)
              (?POSITION IS IN CLASS SM.POSITIONS)
              (THE STATE OF ?POSITION IS ?NEXT-STATE)
              (CANT.FIND (THE LAST.STATE OF ?POSITION IS ?NEXT-STATE))
              (THE SYSTEM-CURRENT-TIME-VALUE OF CLOCK-VALUES IS ?TIME)
         THEN
              (CHANGE.TO (THE ELAPSED.TIME OF ?POSITION IS ?TIME))
              (CHANGE.TO (THE LAST.STATE OF ?POSITION IS ?NEXT-STATE))
              (LISP (UNITMSG 'TODS.METHODS 'COMPUTE-POSITION-EFFICIENCY
                     ?POSITION))))

(POS.STATE.DOFF (IF (THE CURRENT.POSITION OF SM.POSITIONS IS ?POSITION)
              (THE LWU.SENSOR.STATE OF ?POSITION IS CUT.IN)
              (THE BREAK.SENSOR.STATE OF ?POSITION IS SPINNING)
              (THE STATE OF ?POSITION IS RUN)
              (THE LAST.STATE OF ?POSITION IS RUN)
         THEN
              (CHANGE.TO (THE OVERSPIN.TIMER OF ?POSITION IS STOP))
              (CHANGE.TO (THE STATE OF ?POSITION IS DOFF))))
```

FIG. 13 (Continued)

```
(POS.STATE.DOWN (IF (THE CURRENT.POSITION OF SM.POSITIONS IS ?POSITION)
            (THE BREAK.SENSOR.STATE OF ?POSITION IS BREAK)
            (OR (THE STATE OF ?POSITION IS RUN)
                (THE STATE OF ?POSITION IS DOFF)
                (THE STATE OF ?POSITION IS START))
         THEN
            (CHANGE.TO (THE DOFF.TIMER OF ?POSITION IS STOP))
            (CHANGE.TO (THE OVERSPIN.TIMER OF ?POSITION IS STOP))
            (CHANGE.TO (THE STATE OF ?POSITION IS DOWN))
            (CHANGE.TO (THE NEEDS OF ?POSITION IS MAINTENANCE))
            (LISP (UNITMSG 'TODS.METHODS 'UPDATE-WIPE-TIME ?POSITION))))

(POS.STATE.RUN (IF (THE CURRENT.POSITION OF SM.POSITIONS IS ?POSITION)
            (THE LWU.SENSOR.STATE OF ?POSITION IS WINDING)
            (THE RWU.SENSOR.STATE OF ?POSITION IS WINDING)
            (CANT.FIND (THE STATE OF ?POSITION IS RUN))
            (THE SYSTEM-CURRENT-TIME-VALUE OF CLOCK-VALUES IS ?TIME)
         THEN
            (CHANGE.TO (THE DOFF.TIMER OF ?POSITION IS START))
            (CHANGE.TO (THE OVERSPIN.TIMER OF ?POSITION IS START))
            (CHANGE.TO (THE ELAPSED.TIMER OF ?POSITION IS START))
            (CHANGE.TO (THE START.TIME OF ?POSITION IS ?TIME))
            (CHANGE.TO (THE STATE OF ?POSITION IS RUN))
            (CHANGE.TO (THE NEEDS OF ?POSITION IS NO-SERVICE))
            (LISP (UNITMSG 'TODS.METHODS 'UPDATE-LOG-DMS-UP ?POSITION))))

(POS.STATE.START (IF (THE CURRENT.POSITION OF SM.POSITIONS IS ?POSITION)
            (THE STATE OF ?POSITION IS OFF)
            (THE BREAK.SENSOR.STATE OF ?POSITION IS SPINNING)
         THEN
            (CHANGE.TO (THE PACK.TIMER OF ?POSITION IS START))
            (CHANGE.TO (THE WIPE.TIMER OF ?POSITION IS START))
            (CHANGE.TO (THE STATE OF ?POSITION IS START)))))
```

POSITION-SMO STATE DIAGRAM

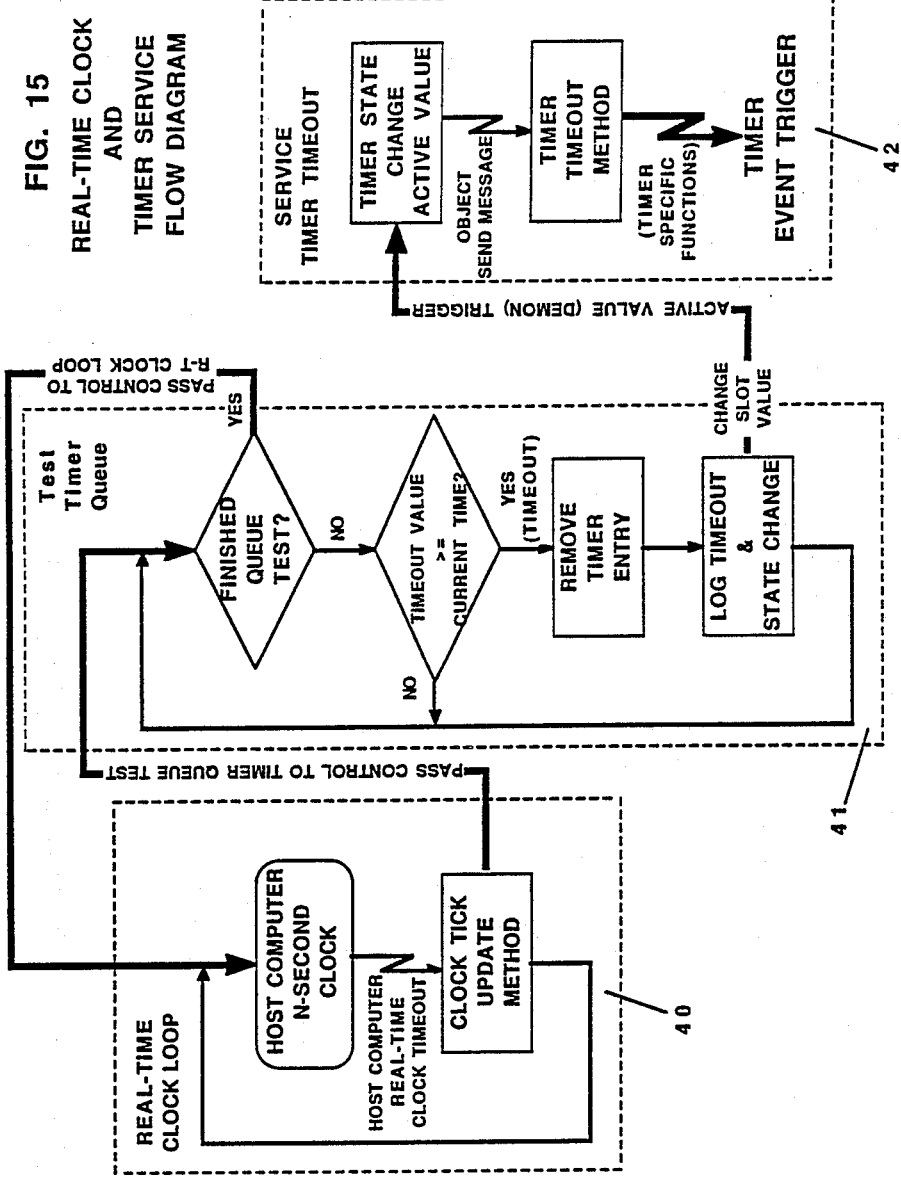
FIG. 15 REAL-TIME CLOCK AND TIMER SERVICE FLOW DIAGRAM

FIG. 16

```
;;; Timer Queue List: Timer Entries Stored as a List of Lists with:
;;;
;;;   First Element    = Future Timeout Value in Seconds
;;;                        in Universal Time Format
;;;   Second Element = The Unit Instance Owning this Timer
;;;   Third  Element   = The Name of the Timer
;;;                        (and the Timer STATE Slot)
;;;   Fourth Element  = The Clock Value at the Timeout in Seconds
;;;   Fifth  Element   = The Method to Send a Message To on Timeout
;;;   Sixth  Element   = The Next State Value for the Timer
;;;                        (STOP, START or TIMEOUT)

;;; In this example, there are three timers for one
;;; Spinning Machine Position active:

(TIMER-QUEUE-LIST
 ((2787253367
      SM.11.POS.1
      DOFF.TIMER
      DOFF.TIMER.TIMEOUT
      DOFF.TIMER.METHOD
      TIMEOUT)
  (2787254567
      SM.11.POS.1
      OVERSPIN.TIMER
      OVERSPIN.TIMER.TIMEOUT
      OVERSPIN.TIMER.METHOD
      TIMEOUT)
  (2787249417
      SM.11.POS.1
      ELAPSED.TIMER
      ELAPSED.TIMER.TIMEOUT
      ELAPSED.TIMER.METHOD
      TIMEOUT)))
```

SYSTEM CLOCK CONTROL

| CLOCK MODE | STOP | RUN | RESET |
|---|---|---|---|

ELAPSED TIME
3:35:50

SYSTEM CURRENT TIME
7/07/88  16:46:21

TIME SCALE (*sec)
1

TODS CONTROL PANEL

| INITIALIZE SM | TODS-INITIALIZE-SM-METHOD |
|---|---|
| CREATE NEW SM | TODS-CREATE-SM-METHOD |
| ADD NEW PRODUCT | TODS-CREATE-PRODUCT-METHOD |
| MERGE CHANGE | TODS-MERGE-CHANGE-METHOD |
| INITIAL POSITION | TODS-INITIALIZE-POSITION-METHOD |

(CONTINUED)

SPINNING MACHINE POSITION

| SPINNING MACHINE | POSITION # |
|---|---|
| 11 | 1 |

POSITION STATE: RUN

| DOFF TYPE | POSITION NEEDS |
|---|---|
| REG | NO-SERVICE |

| PACK TIME REMAINING | POS SMO STATUS |
|---|---|
| 717:04:10 | IDLE |

| WIPE TIME REMAINING | POS EFFICIENCY |
|---|---|
| 17:29:10 | 1.0 |

(CONTINUED)

TEAM 2 STATUS

| JANE'S ASSIGN | LINDA'S ASSIGN | MARY'S ASSIGN |
|---|---|---|
| IDLE | GET READY | IDLE |
| JANE'S POS | LINDA'S POS | MARY'S POS |
| UNKNOWN | UNKNOWN | UNKNOWN |
| JANE'S STATE | LINDA'S STATE | MARY'S STATE |
| IDLE | IDLE | IDLE |
| JANE'S SIM | LINDA'S SIM | MARY'S SIM |
| UNKNOWN | UNKNOWN | UNKNOWN |

TODS SENSOR CONTROL

| SIMULATE BREAK | TODS-SIMULATE-BREAK-METHOD |
|---|---|
| SIMULATE STRINGUP | TODS-SIMULATE-STRINGUP-METHOD |
| MAKE SENSORS GOOD | TODS-RESTORE-GOOD-SENSORS-METHOD |

GENERAL EVENT PROCESSING ALGORITHM

SPINNING MACHINE POSITION

| SPINNING MACHINE | POSITION # |
|---|---|
| 11 | 1 |

| POSITION STATE |
|---|
| DOWN |

| DOFF TYPE | POSITION NEEDS |
|---|---|
| REG | MAINTENANCE |

| PACK TIME REMAINING | POS SMO STATUS |
|---|---|
| 713:03:20 | WORKING |

| WIPE TIME REMAINING | POS EFFICIENCY |
|---|---|
| 13:28:20 | 0.99378675 |

| PACKAGE SIZE | TIME REMAINING |
|---|---|
| 100/80/60/40/20/0 | 0:00:00 |
|  | PACKAGE SIZE (%) |
|  | 76.12403 |

| BREAK SENSOR STATE |
|---|
| BREAK |

| LWU SENSOR STATE | RWU SENSOR STATE |
|---|---|
| CUT.IN | CUT.IN |

FIG. 20

INFERENTIAL TIME-OPTIMIZED OPERATION OF A FIBER PRODUCING SPINNING MACHINE BY COMPUTERIZED KNOWLEDGE BASED SYSTEM

BACKGROUND OF THE INVENTION

The present invention relates to a new and improved computerized method for task management and, more particularly, it relates to a computerized method for task management of synthetic fiber spinning machine operators.

During normal operation of synthetic fiber spinning machines, polymer is conveyed from a polymerization vessel and extruded through a spinneret to form a group of filaments which are conveyed to a windup and wound on bobbins to form yarn packages. Often, operations such as drawing, relaxing and heat treating the yarn are performed between the spinneret and the windup. Commonly, the group of advancing filaments is split into individual "ends", with each end forming a separate yarn package.

A variety of operations are performed by operators on such spinning machines. A very important operation referred to as "doffing" involves removal of a package from the windup and restringing the advancing end onto a fresh bobbin.

Doffing is a task performed in response to a variety of events, for example a scheduled doff occurs when a package is full or when maintenance tasks (e.g., wiping residues from the spinneret face or changing equipment such as the spinning pack) must be performed; an unscheduled doff occurs when a threadline breaks.

These events requiring operator tasks do not always occur in an ordered, planned manner. Frequently two or three events occur in rapid succession or simultaneously or on opposite sides of a spinning machine and not only cause confusion and consternation on the part of the operator (or teams of operators) but result in inefficient operation at times, causing costly waste. Another deleterious result is production of off-size yarn packages which are very difficult for fabric producers to use efficiently.

Many systems have been proposed to overcome some of the disadvantages of this state of affairs. In one system the operator presses a button after restringing a position to signal a computer to activate a light indicating need to doff at a preset time at a specific position. Unfortunately, many times the operator does not see the light, especially if he is on the other side of the machine. Systems are known which use an electronic sensor to determine the presence or absence of threadlines at a given windup position (hereinafter termed "position"). The sensor signal is input to a computer to produce information on status of each position; i.e., whether or not it is winding fiber, and a specific time schedule for doffing each position. In some systems the information is displayed on a computer-driven display for ready viewing by operators. The latter system has several deficiencies. Use of a single sensor per position does not provide reliable enough information to distinguish between the various possible states of each position; i.e., (a) winding fiber (referred to as the "Run State"), (b) not winding fiber because it is being doffed (referred to as the "Doff State"), (c) not winding fiber due to a threadline break (referred to as the "Down State"). Further complications occur such as giving misleading information when the sensor itself fails (a common occurrence).

SUMMARY OF THE INVENTION

This invention provides a method for task management of synthetic fiber spinning machine operators of a multiposition textile spinning machine which overcomes the deficiencies of the prior art and wherein a plurality of filaments are advanced as a yarn bundle, then split into individual threadlines which are wound onto yarn packages. The method comprises electronically sensing presence or absence of the yarn bundle and threadlines at locations before and after the split, electronically storing and processing the information and indicating by display indicia the knowledge:

(1) validity of the sensing information;
(2) operating state of positions;
(3) classifying change in operating state of the positions;
(4) operating state of the spinning machine operators;
(5) classifying change in operating state of the spinning machine operators;
(6) timing for task performance.

The processing is performed by a real-time event-driven expert system including a fact base, a rule base, and an inference engine, which automatically reasons, makes inferences and follows hueristic rules in a manner similar to how the the human mind is thought to operate in response to asynchronous sensing input changes or time queued events within a specified time interval.

The present invention employs a plurality of sensors to sense the presence or absence of advancing threadlines at locations before and after the yarn bundle split, and a central processing unit (digital computer herein termed "Host Computer") communicating with the sensors and operating under program control of an expert system which reasons, makes inferences and displays knowledge to assist the spinning machine operator (hereinafter "SMO") in his tasks.

In the illustrated operation, the system set-up, flow of data and processing of information follows the pattern:

(a) storing the configuration and standard operating conditions of the spinning machines in a fact base portion of the expert system knowledge base;
(b) monitoring by means of a sensor the presence or absence of the advancing yarn bundle and threadline for at least three locations on each position as a function of time:
  (1) prior to the point where the advancing yarn bundle splits and proceeds to individual left and right windups,
  (2) the threadline to the left windup, and
  (3) the threadline to the right windup;
(c) conveying signals from the sensors to an input-/output (I/O) subsystem that converts the signals into digital signals that can be read by a digital computer;
(d) storing the input (on or off) of said sensors in the fact base portion of the expert system knowledge base;
(e) identifying the rules in the rule base portion of the expert system knowledge base which have the specific fact that has changed state in their premise;
(f) evaluating said rules with a forward chained inference engine;
(g) inferring the states of the various positions;
(h) inferring certain sensor failure modes and assigning a most probable state to the sensor;

(i) performing the action specified in the conclusion portion of those rules whose premises are logically true;

(j) providing a mechanism for the expert system to recognize timed events with respect to a real-time calendar clock and respond to such events within a specified time interval;

(k) providing a plurality of timing functions to determine when a position should be doffed, wiped or pack changed, including the times remaining before these tasks should be performed; and (l) displaying the aforementioned information for the SMO in a suitable format (text or graphic), on a suitable computer-driven display.

The real-time expert system comprises an expert system development and execution environment, or shell, a fact base of declarative knowledge in an object oriented paradigm, a rule base of inferential knowledge in the form of IF-THEN rules, and "methods" or "demons" for procedural aspects; e.g., timer functions, I/O subsystem functions, of the system.

BRIEF DESCRIPTION OF THE DRAWINGS

FIG. 8 is a list of an object's slots and their values in the generic class of spinning machine positions.

FIG. 8B is a state diagram of left windup unit (LWU) and right windup unit (RWU) states.

FIG. 9B is a list of SMO class object's slots.

FIG. 12 is a list of the POSITION.SENSOR.IO.-RULES rule set in LISP-based language form.

FIG. 12A is a list of the POSITION.SENSOR.-STATE.RULES in LISP-based language form.

FIG. 12B is a list of POSITION.SENSOR. VALIDATION.RULES rule set in LISP-based language form.

FIG. 13 is a list of the POSITION.STATE.RULES rule set in LISP-based language form.

FIG. 15 is a flow diagram for the real-time clock and timer service facility added to the expert shell system environment for real-time processing.

FIG. 16 is an example of timer entries on the timer queue facility.

FIG. 20 is a representation of a typical screen display of a position display in the down state after a threadline break event.

DETAILED DESCRIPTION

An expert system is a software program that runs on a computer system and contains information or knowledge about a real world problem, situation or environment and makes inferences about a given state or change of the knowledge, such as discussed in Charniak E. and McDermott D., "Introduction to Artificial Intelligence", pp. 44–360, pp. 437–440, Addison-Wesley, Reading, MA, 1986 and Hayes-Roth F., Waterman D. A., Lenat D. B. ed., "Building Expert Systems", pp. 59–86, pp. 89–167, Addison-Wesley, reading MA, 1983

Expert systems generally contain a knowledge base and an inference mechanism to manipulate the data in the knowledge base. A knowledge base contains a description or model of the problem space and includes all facts or data values representing the state of the environment and a set of logical operators that manipulate the facts to derive a new state.

Figure 7:
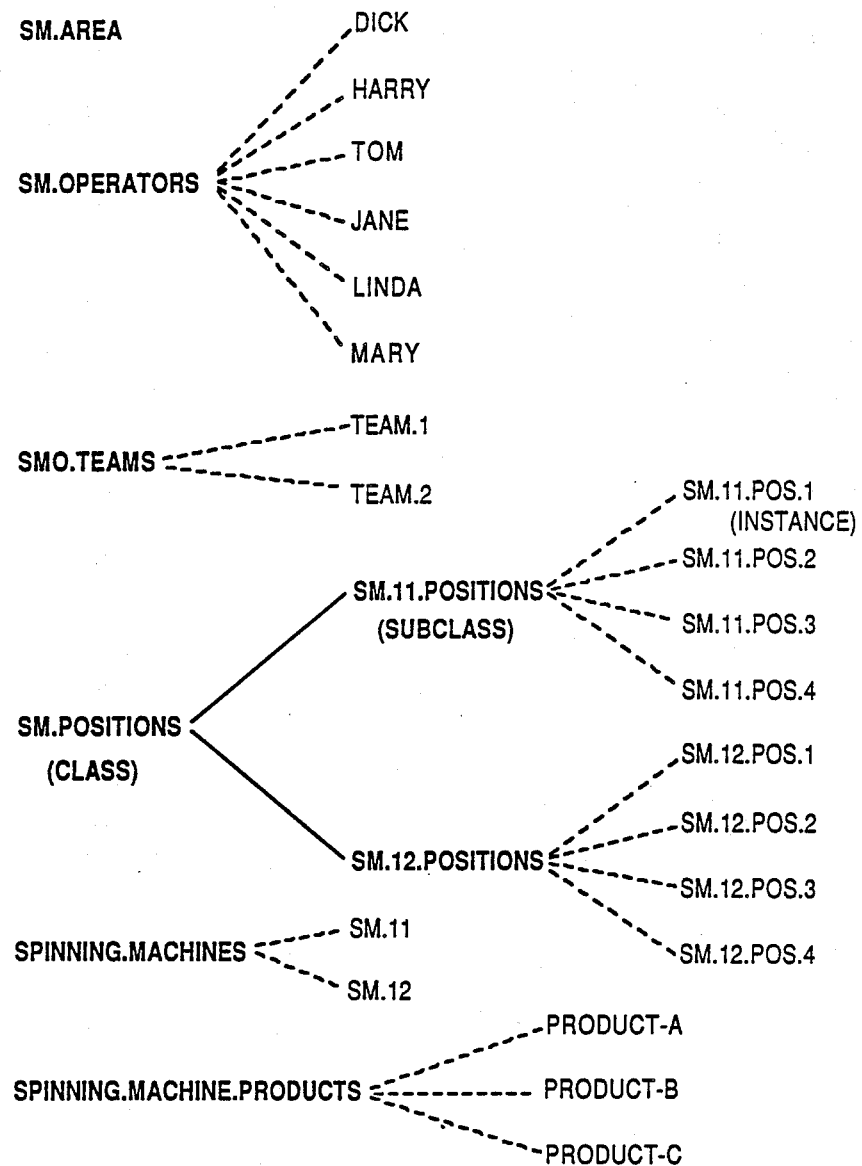
FIG. 7 is a diagram of object representation hierarchy.

The facts in the fact base portion of the knowledge base can be represented as objects in an object oriented paradigm (reference is made to Cox, Brad J., "Object Oriented Programming, an Evolutionary Approach", p. 29–91, Addison-Wesley, Reading, MA, 1986), with objects having attributes and values, which is incorporated herein by reference. Object classes and inheritance are used in the description of a model, where a class is a general description of an object and specific instances of an object inherit all of the attributes of the parent class. Spinning machines (SM), winding positions and operators are examples of general classes, and SM 11, POSITION 1 and an operator named "Dick" are examples of instances of each class which inherit all of the characteristics of their parent classes, but hold unique values in their slots. FIG. 7 shows this hierarchy.

U.S. Pat. No. 4,675,829 discloses details of a system defining class units in a frame based system that contains one or more slots which may have one or more symbolic or arithmetic values and is incorporated herein by reference.

The logical operators contained in the rule base can be represented by rules, each containing a premise (IF part) and a conclusion (THEN part). If all conditional facts in a premise are found to be true, then the conclusion of the rule is asserted into the knowledge base. The inference mechanism in an expert system is a program that controls the execution of rules in a knowledge base and uses forward or backward chaining.

In the system represented in the above-referenced U.S. Pat. No. 4,675,829, for example, rules are entered in an English-like context in an IF premise THEN conclusion format and the inference engine can be run in both forward and backward chaining modes. In the present invention changes to facts in the knowledge base can be made without human intervention and conclusions can be drawn and actions taken within a specified time interval. Furthermore, the notion of time as an event and time values as facts in a knowledge base are contained in the spinning operation model. The present invention uses a real-time, on-line expert system that responds to changes in sensor input signals and time sequences which are represented as changes in facts in a knowledge base. This requires a data driven, forward chaining inference engine to process the rules, to draw conclusions from new facts asserted from real world events. Time and sensor events are represented by software in the expert system as "Methods" and "Demons" Methods are software functions which are invoked when passed a message indicating an action to be performed. Demons are software functions that are invoked when the value of an object slot is modified or referenced. In the instant system, demons are attached to sensor input slots and queue events to the expert system inference engine whenever a value is changed.

Figure 1:
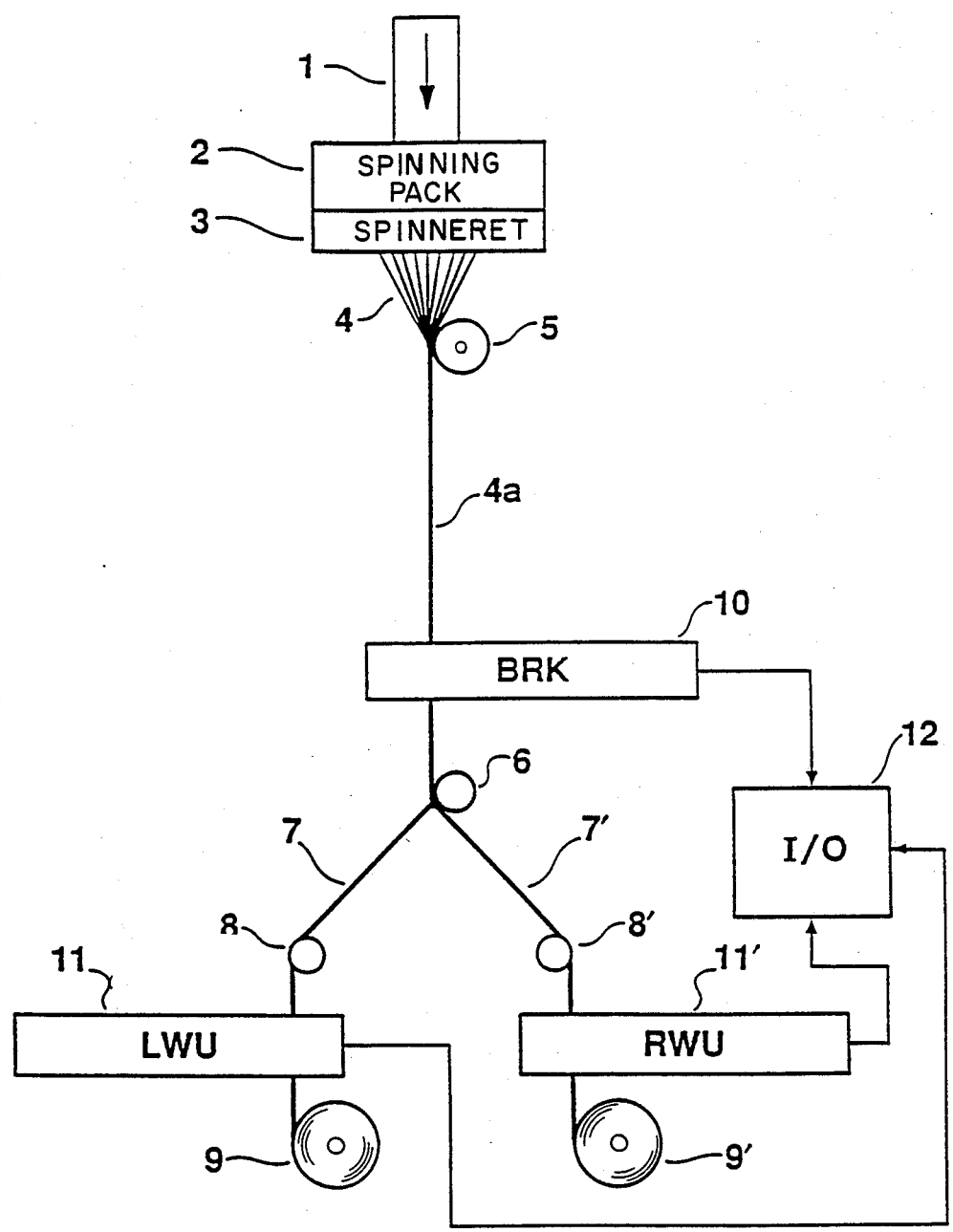
FIG. 1 is a schematic representation of a single position of a synthetic fiber spinning machine showing its connection to a part of the computer system according to the present invention.

Referring now to FIG. 1, polymer is conveyed from a polymerization vessel (not shown) in the direction of the arrow through suitable piping 1 to a spinning pack 2 containing mult-iorificed spinneret 3, extruded from the spinneret orifices to form a group of filaments 4 which pass downwardly as a yarn bundle 4a and pass around puller roller 5 and advance to roller 6 where the yarn bundle splits into a left threadline 7 and right threadline 7'. As shown, each advancing threadline then passes by roller guides 8 and 8' and is wound onto bobbins to form yarn packages 9 and 9'. The hardware associated with windup of ends 7 and 7' is referred to broadly as left windup unit (LWU) and right windup unit (RWU), respectively. Of course, many intermediate processes may occur during passage of the filaments from spinneret 3 to packages 9 and 9', such as heating, cooling, drawing, interlacing, liquid finish application, etc.

Electronic sensing devices (BRK) 10 are used to sense the presence or absence of a yarn bundle 4a, sensing devices 11 associated with the LWU and 11' associated with the RWU sense presence or absence of a yarn threadline 7, 7', respectively, at the three positions shown, and input the signals to I/O subsystem 12.

Figure 2:
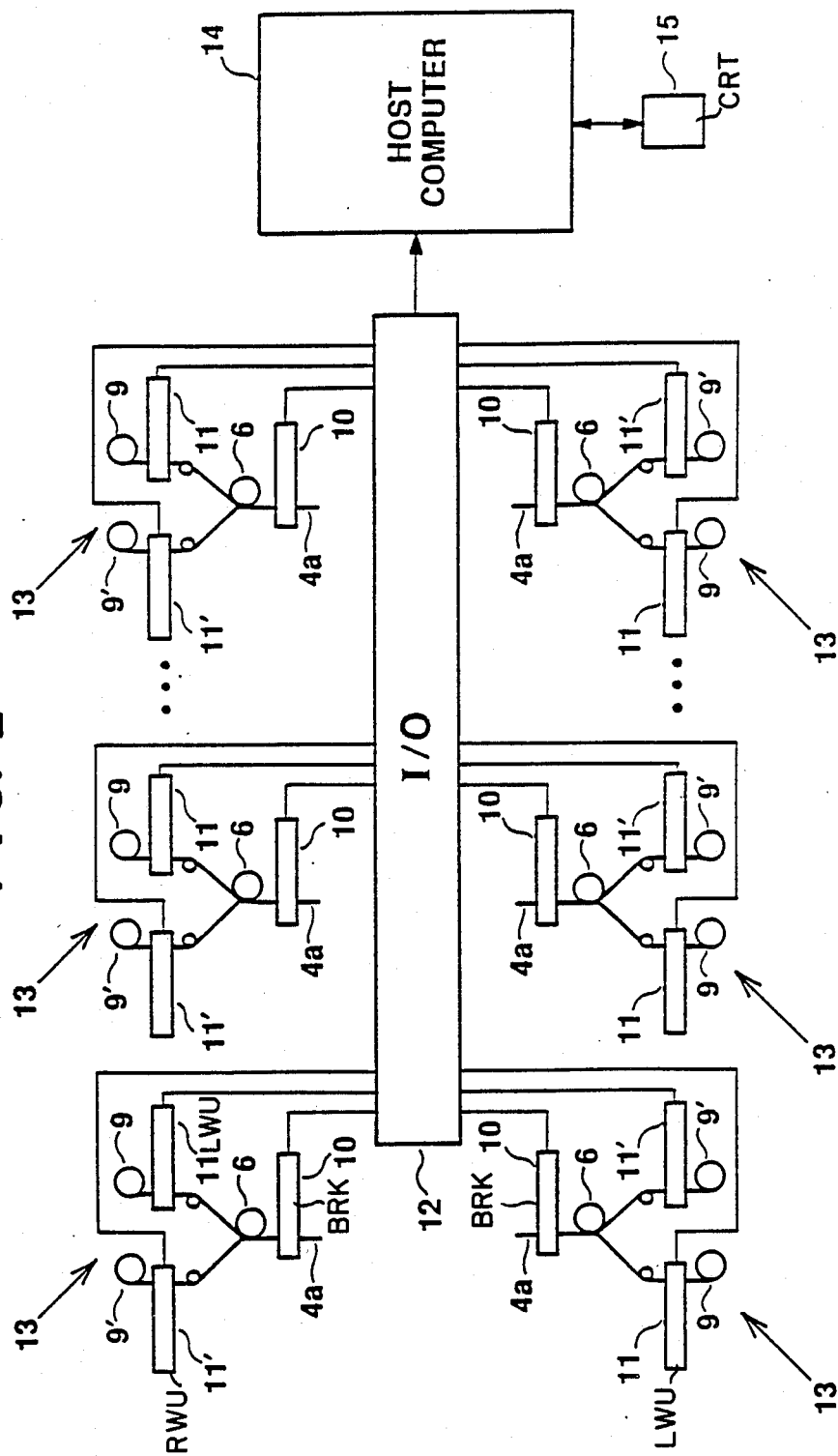
FIG. 2 is schematic representation of a group of positions of a synthetic fiber spinning machine showing their connection to the computer system according to the present invention.

In FIG. 2 the sensing devices of a plurality of spinning positions 13 (only portions of the windups are shown, for simplicity) input to I/O subsystem 12 which inputs to host computer 14 which interfaces via cathode ray tubes (CRT's) 15 (only one shown).

The sensors detect the presence or absence of advancing yarn bundles and threadlines. This is preferably done by using an infrared (IR) diode emitter and a diode detector to generate an electric signal. As the advancing threadline breaks the IR beam, the electric signal varies with time. It is the variation of the electric signal which is detected and generates an indication that the threadline is present. Thus, if the IR beam is totally blocked or if the IR beam is never interrupted, the detector would indicate that no yarn is present. A preferred sensor is the MU-T29-WU Vigilo sensor produced by Dent Sensors Ltd. of Great Britain.

Figure 3:
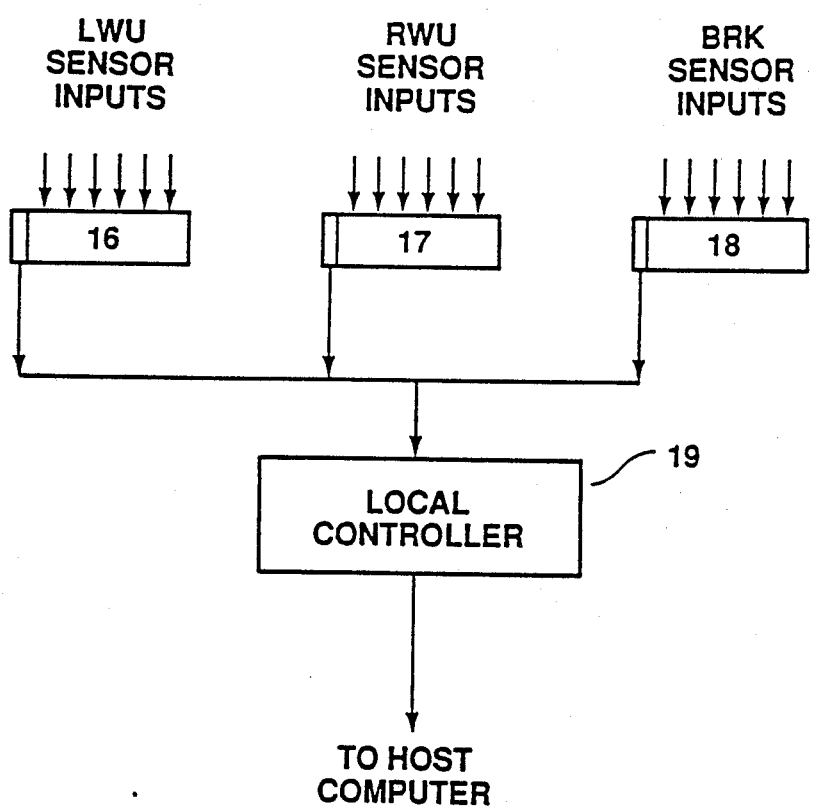
FIG. 3 is a block diagram of the I/O subsystem of FIGS. 1 and 2 which converts electrical sensor signals into computer readable digital information for the host computer.
Figure 4:
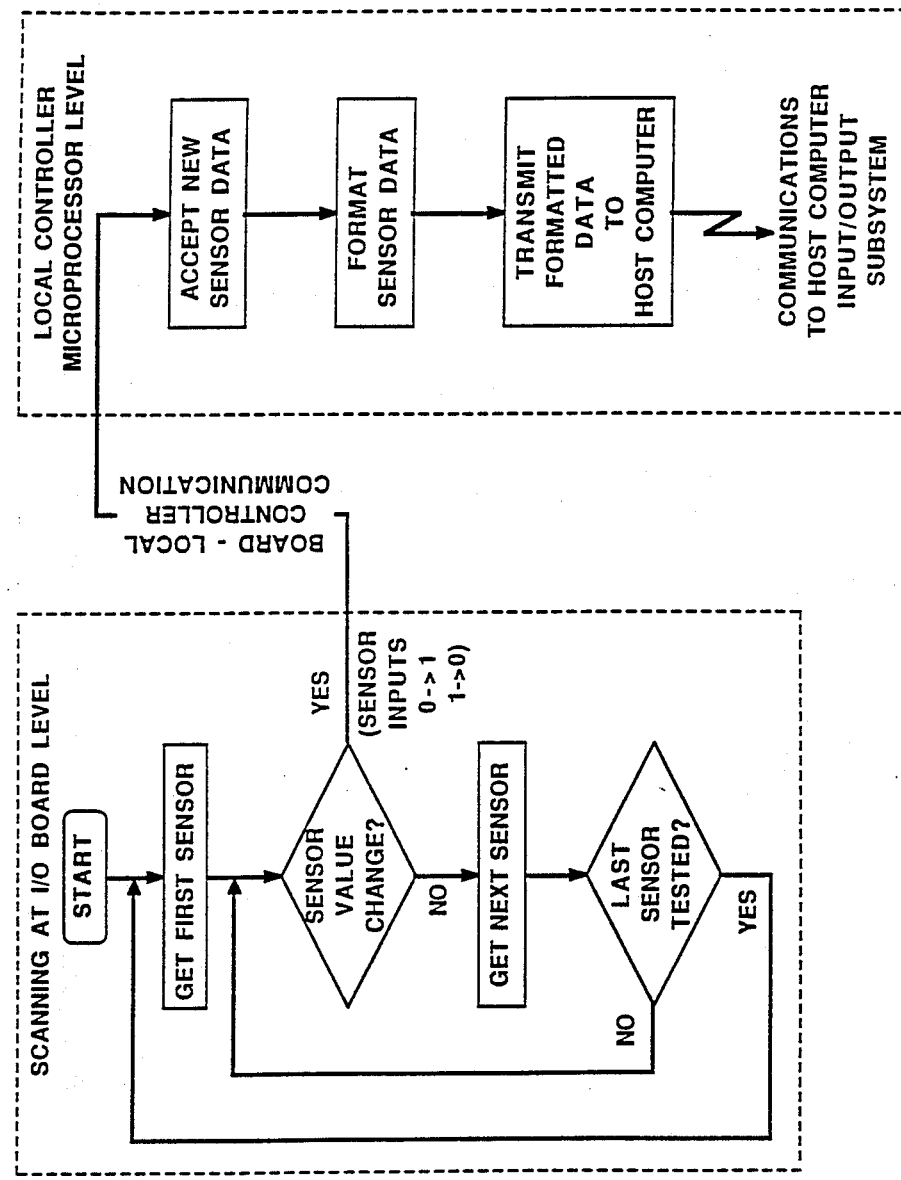
FIG. 4 is a logic flow diagram of the I/O subsystem scanning process.

The I/O subsystem 12 is an intelligent system which off-loads the scanning functions from the host computer. As illustrated in FIG. 3, inputs from the LWU and RWU and BRK sensors are fed to the I/O subsystem comprising I/O circuit boards 16, 17 and 18. Only six inputs are shown for each of only three I/O circuit boards, for simplicity. The I/O circuit board is preferably the PB-16A commercially available from OPTO-22 Company, 15461 Spring Dale Street, Huntingdon Beach, CA. Signals from boards 16, 17, and 18 are input to local controller 19 which preferably is a microprocessor (e.g., coded LC-2 also available from OPTO-22 Company). Signals from local controller 19 are input to the host computer 14. In operation (as shown in FIG. 4), each board 16, 17, 18 is responsible for the change in sensor states associated with its inputs. For example, when the sensor for the LWU changes state, the digital electronics on the board detect this change. Local controller 19 continuously scans the I/O points and compares the present state with the previous one. When a change is detected, the local controller notes which sensor has changed state, what the new state is and the time at which the state change occurred by attaching a time stamp to the data. Then using a standard I/O link such as RS232 (a well-known hardware standard which defines the electrical signal and the physical connection for serial asychrouous communication between two computer systems), the local controller inputs the information to the host computer.

The data from the sensors is digital in nature. That is, the signal takes on one of two possible voltage levels which indicates the presence or absence of threadline. The board which receives the data uses optical isolators to isolate the I/O from the sensors themselves. A preferred optical isolator module is the IDC5 manufactured by OPTO-22 Company. On the board is a communications card which handles all the communication with the local controller. An example of the communications card is OPTO-22-PB-16MD also available from OPTO-22 Company.

The local controller can store in memory many sensor state changes and the times at which they occur. Thus if the host computer 14 becomes disabled for a period of time, record of events is not lost. When the host computer comes back on-line, the data stored by the local controller is transmitted to it. The host computer is then able to reconstruct the events which occurred while it was disabled. Records can be generated as well as the events such as doffs which might have occurred on the Spinning Machine.

Information passes from the sensors through the I/O circuit board through the local controller 19, then to the host computer 14 according to the logic diagram shown in FIG. 4. In the process the I/O scans all the input sensors, determines which sensor values have changed and reports to the host computer only those sensors which have changed value (sensor events).

Figure 5:
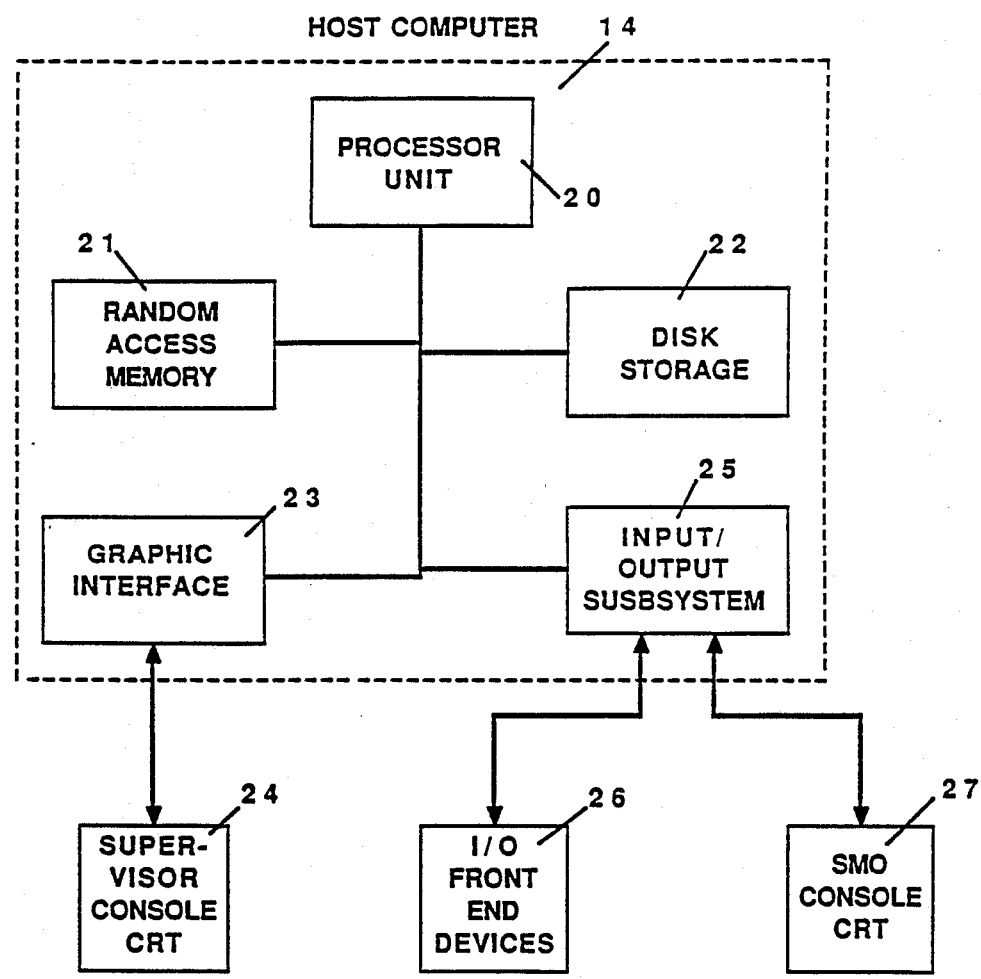
FIG. 5 is a block diagram of the host computer including processors, I/O interfaces and user interfaces.

As shown in FIG. 5, host computer 14 comprises a central processor unit 20, random access memory 21 (e.g. 8 Mbytes), hard disk storage 22 (e.g. 368 Mbytes), graphic interface 23 with a supervisor's CRT console 24 and mouse input device (not shown), and an I/O subsystem 25 for interfacing to the I/O front end devices 26 and an SMO CRT terminal 27.

Preferably, the computer system is optimized to run the Common LISP language (reference is made to Steele, Guy 2., "Common LISP, The Language", Digital Press, Burlington, MA 1984).

The host computer 14 consists of standard hardware for symbolic processing and its custom operating system software, which together provide a platform for the development and execution of the present invention's expert system which requires real-time, multiprocessing capabilities for I/O interfacing and knowledge base processing. The Symbolics 3650 LISP Machine from Symbolics Inc. of Cambridge, MA, is preferred as a computer system for the real-time expert system of the present invention (reference is made to Bromley, Hank, "LISP Lore: A Guide to Programming the Lisp Machine",. pp 43-54, pp 119-136, Kluwer Academic Publishers, Boston MA, 1986).

The expert system development and execution environment consists of a shell (software package) with the required elements for an object-oriented representation of the process for spinning synthetic yarns, a rule editing system and forward chaining inference engine, programmatic access to system and I/O functions for timed sequence and sensor driven events, simulation and, textual and graphic display interfaces. The shell is used as the basis for the real-time expert system.

Figure 6:
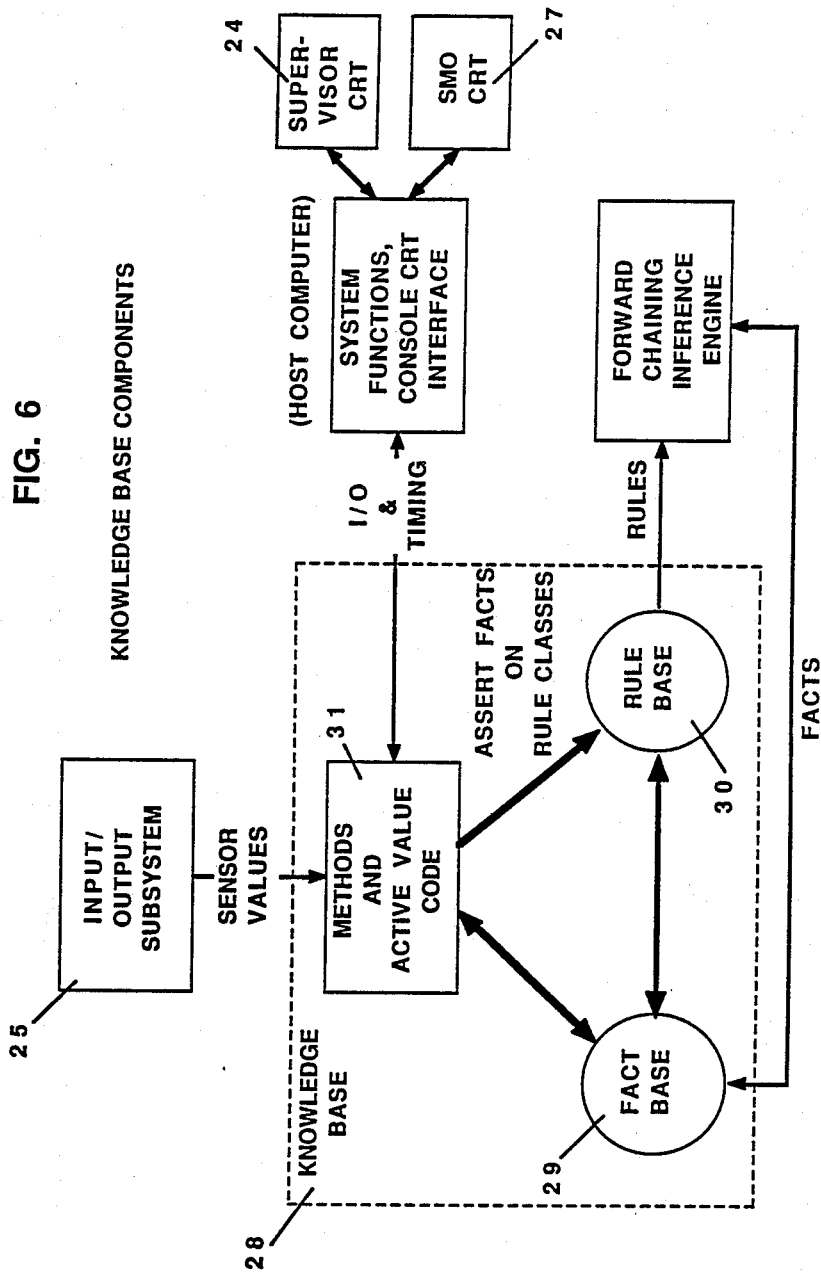
FIG. 6 is a block diagram of the knowledge base including intellectual expertise and algorithm components.

As shown in FIG. 6, the knowledge base 28 software consists of three primary components: fact base 29, rule base 30 and methods and active value code 31.

A particular feature of this software is that it distinctly separates the object representation of the fact base from the rules in the rule base and software in the methods code 31. The arrows show the interaction of parts of knowledge base with other elements of the system. The Methods and Active Value Code 31 are in the form of LISP functions and interface between sensor I/O interface 12 operations and timer management functions and host computer and individual CRT's 27, 27' as shown. The fact base 29 containing all the object classes and instances of classes for each physical entity in the operation of the spinning machine; for example the machine configuration, standard operating conditions, etc. fact base 29 and rule base 30 interact with the forward chaining inference engine as shown.

Figure 8A:
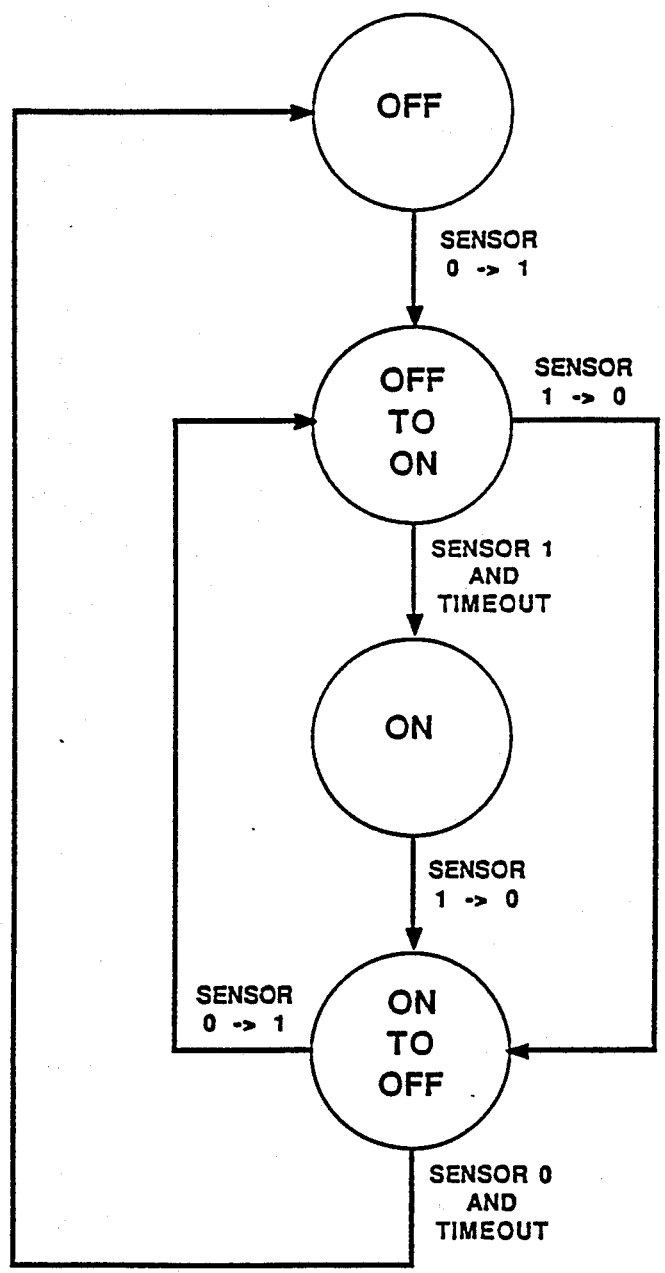
FIG. 8A is a state diagram of Sensor State Transitions.

FIG. 7 shows the configuration of a spinning machine showing objects and relationships between objects as part of the fact base 29. Represented is a spinning area in a textile plant with two spinning machines, SM.11 and SM.12. Each SM has four winding positions, SM.11.POS.1, etc. that are instances of the class SM.POSITIONS, a generic spinning machine winding position. Each position instance inherits all member slots and default values from SM.POSITIONS. Examples of slots defined in class SM.POSITIONS are listed in FIG. 8. Each position instance has several slots indicating the input value (ON, OFF), validated transition state (OFF, ON.TO.OFF, ON, OFF.TO.ON), inferred operating state (SPINNING, BREAK, etc.), and conditions (BAD, GOOD) for the BREAK, LWU and RWU sensors. Each sensor also has a set of slots defining a timer used to validate stable sensor states (ON, OFF). FIG. 8A shows the sensor state transition diagram which models sensor transitions. For example, suppose the BREAK.SENSOR.INPUT of SM.11.POS.1 changes from OFF to ON. An active value attached to this slot is activated, which detects the transition according to FIG. 8A and starts the BREAK.SENSOR.-TIMER validation timer. On a Timeout, if the sensor has remained ON, then the stable ON state is inferred in the BREAK.SENSOR slot, which serves as a "sensor event" mechanism.

Other sets of timer slots are also defined which indicate the state of a timer as stop, start, running or timeout, the timer interval and time of state change. Each timer also has a method slot for specific actions to be taken on a timeout state. Each position has a doff timer to time the interval until the next doff cycle, a start timer on both left and right windups to transition from the down or doff state to the run state and timers for queuing the next wipe and pack change cycles. Timers are included to detect time dependent sensor failures also. For example, if either the LWU or RWU sensor does not change state in 1.5 doff cycles and the position is in the run state, the sensor is inferred as bad because there is not enough room to wind a package 1.5 doff cycles in size.

Figure 9:
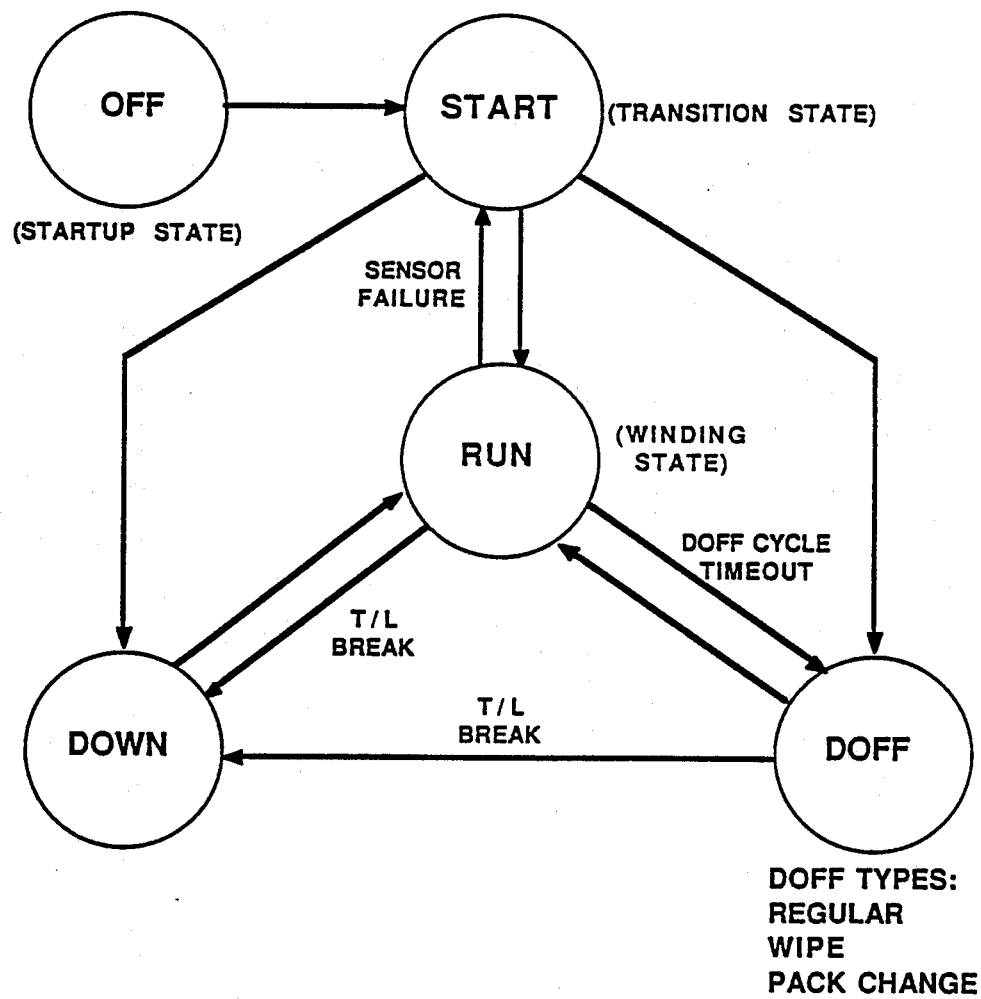
FIG. 9 is a diagram of position states of a position.

Other slots of importance are the state of the position which can be one of off, start, down, doff, or run. As shown in FIG. 9, a state diagram is used to model the operating state of the position. A slot for the doff type reflects normal position operations in conjunction with the timers described.

There is a class of spinning machines whose instances hold machine specific data, such as the product being processed and product related parameters, such as general timer intervals for the doff cycle, wipe cycle and pack change cycle. There are also slots in the spinning machine object class defining the number of positions per machine. There is also a class of spinning machine products with instances for each product made with slots of product specific constants used by the spinning machines and SM.POS instances. This serves as a product database.

Spinning Machine Operators, SMO's, are represented in the fact base as members of the class SM OPERATORS. As shown in FIG. 7, six instances are defined as TOM, MARY, etc. Slots describing SMO's are shown in FIG. 9B and include SM and Position assignment status and simulation data. A STATE slot, governing SMO activity, is defined by the state diagram in FIG. 9A. SMO's who are on-site and available are in the IDLE state waiting to be assigned a task, and when a Position requires service, an SMO is placed in the WORKING state. SMO's are also associated with a class of SM.TEAMS assigned to specific SM's. For example, TEAM.1 in FIG. 7 is assigned to SM.11 and TOM, DICK and HARRY are members of TEAM.1 and therefore service SM.11.

Figure 10:
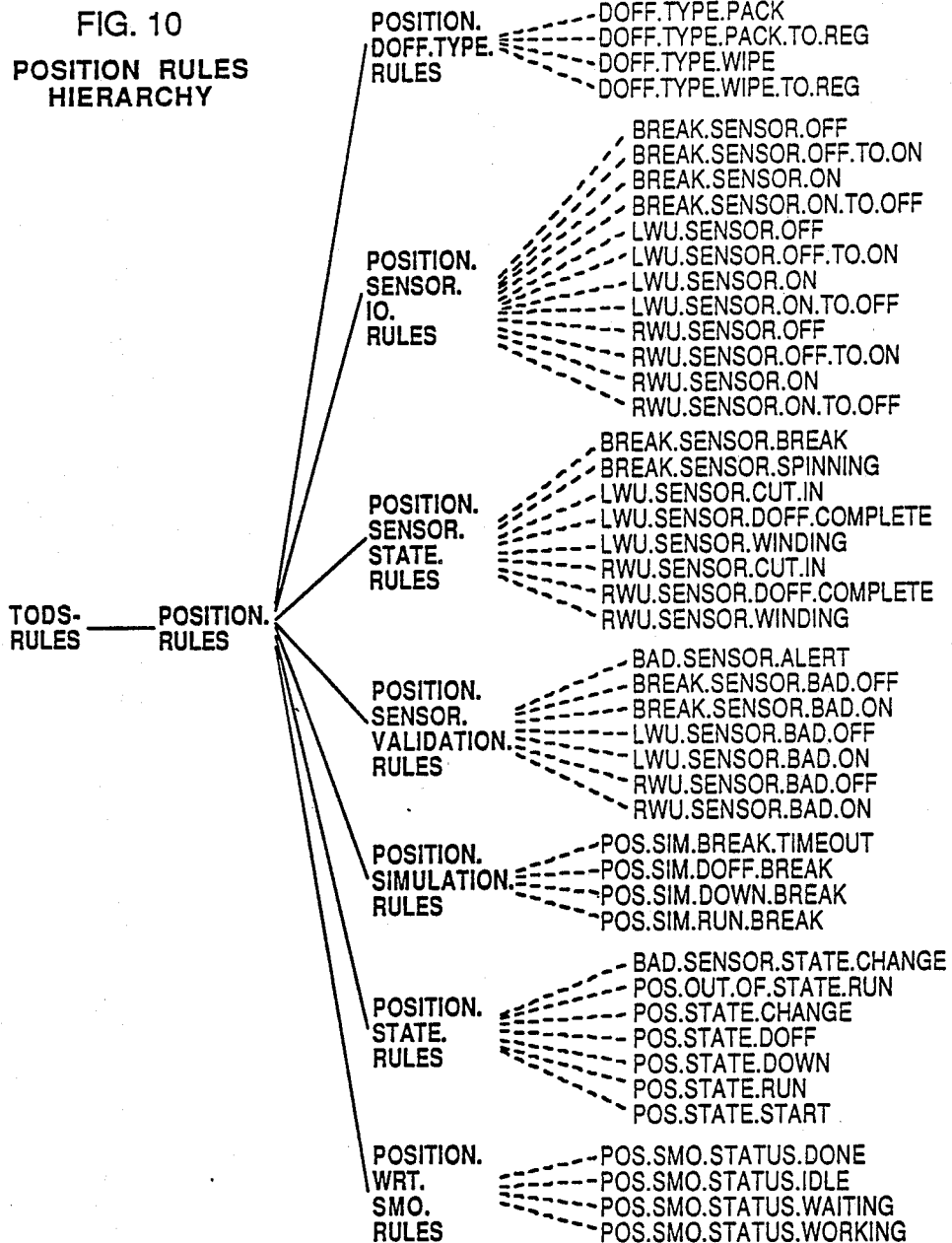
FIG. 10 is a diagram of position rule class hierarchy.
Figure 11:
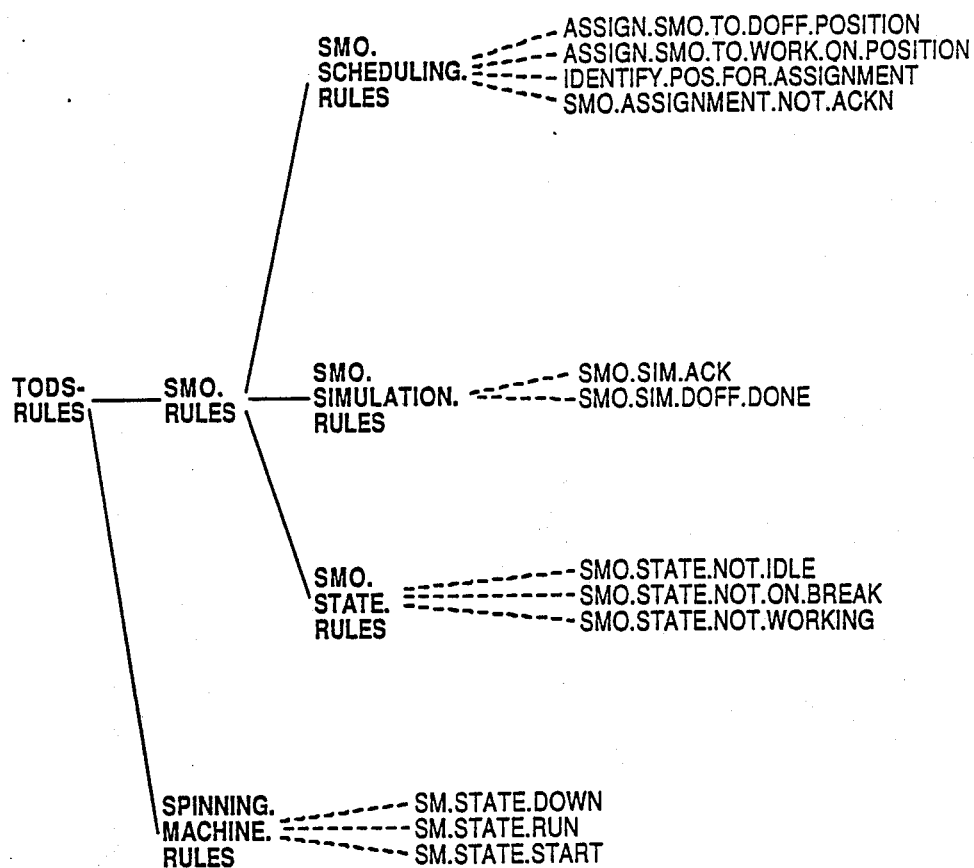
FIG. 11 is a diagram of spinning machine operation rule class and spinning machine state rule class.

The rule base component of the knowledge base is a collection of related IF-THEN rules organized in a class hierarchy as shown in FIGS. 10 and 11. A method or active value initiates forward chaining on a particular rule class, such as the POSITION.RULES. Each rule has a premise testing if facts in the fact base match a given state or value. When all clauses in the premise evaluate to a logically true condition, the facts in the conclusion are then asserted into the fact base or other actions are performed, which may cause other rules in the rule class to be considered (tested) during the chaining process.

Figure 14:
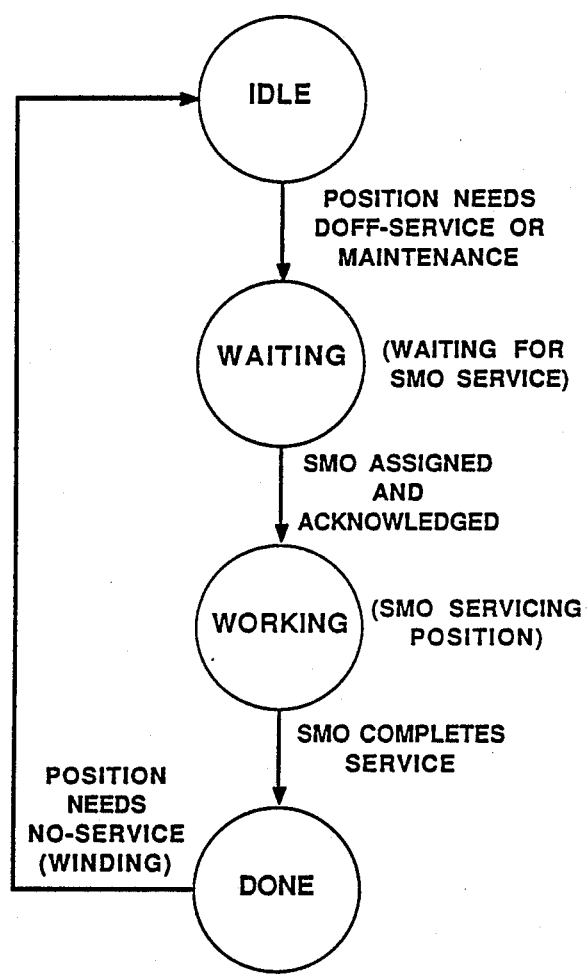
FIG. 14 is a diagram of POSITION-SMO states.

The rules in the rule base are used for several purposes and are organized by function. The rules govern the operating states of Positions, SM's and SMO's, validate sensor inputs, detect failed sensors, schedule SMO's to service Positions, and control SMO and Sensor simulation functions (e.g. for training and testing purposes). The POSITION.RULES class contains subclasses of rules to govern the behavior of SM.POSITIONS instances and their interactions with SMO's. The POSITION.SENSOR.IO.RULES in FIG. 10 determine the stable sensor states and transitions in FIG. 8A. The LISP forms of the POSITION.SENSOR. STATE.RULES, shown in FIG. 12A, control the inferred spinning conditions of positions. For example, the state diagrams for the Left and Right Windups on a Position are shown in FIG. 8B and depend on results of the sensor transition states. The POSITION.SENSOR.-VALIDATION.RULES, which detect sensor failures in both the ON and OFF states, are illustrated in FIG. 12B and look for sensors that fail to change to expected states at specified times or exhibit inconsistent states. Once a bad sensor is detected, other rules are used to alert an SMO or infer a correct operating state from other available information. The POSITION.STATE.RULES in FIG. 11 govern the operating state of a position as defined in FIG. 9. The operating states are inferred from the Sensor states and timing conditions during the forward chaining process and the rules shown in FIG. 13 depend on inferences made by the other rule classes in the POSITION.RULES hierarchy. The POSITION.WRT.SMO. RULES rule class governs the interaction between SM.POSITIONS and SM.OPERATORS instances as shown in the state diagram of FIG. 14. The inferences drawn by these rules are used in the scheduling of SMO's.

Figure 9A:
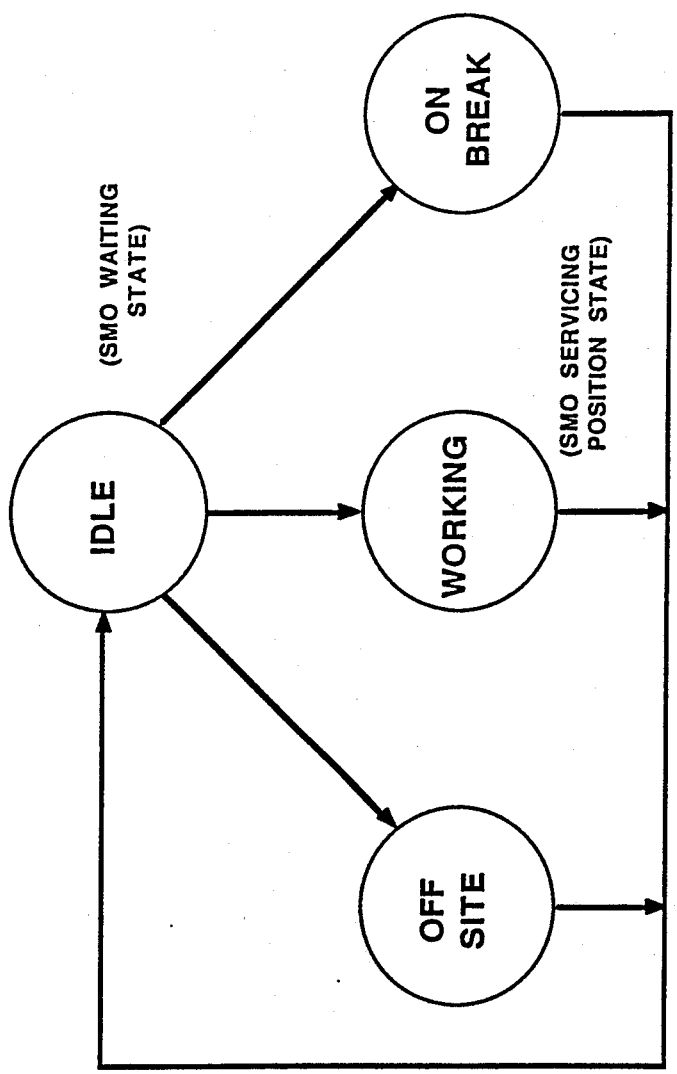
FIG. 9A is a diagram of SMO states.

The SMO.RULES rule class contains rule sets that control the operating states of SMO's as defined in FIG. 9A (SMO.STATE.RULES), scheduling of SMO's in response to changes in position operating states (SMO SCHEDULING.RULES), and simulation aspects of SMO's (SMO.SIMULATION.RULES . The SMO.-STATE.RULES determine the status of SMO's, that is, whether an SMO is IDLE and available for an assignment, WORKING on a position, OFF.SITE or ON.-BREAK and not available. The SMO.SCHEDULING.RULES determine which Position requires service, find the next available SMO's, and assign the SMO's to the required tasks.

The rules are tested when the forward chaining inference engine is invoked by a sensor or timer event. When a sensor changes state or a timer times out, event triggers cause forward chaining to be activated on the rule sets. A particular advantage of the system of this invention is that only one set of rules exists for all objects in the system. Pattern matching is used to bind the rules to the SM.POSITIONS or SMO instances initiating the event by using CURRENT. POSITION and CURRENT.SMO slots defined at the class level which are used in the rule premises. For example, when the BREAK.SENSOR.INPUT of SM.11.POS.1 is changed from OFF to ON, an event is triggered in which the CURRENT.POSITION slot is set to SM.11.POS.1 and forward chaining is invoked. When the BREAK.SENSOR.OFF.TO.ON rule in FIG. 12 is "fired", the variable POSITION is bound to SM.11.POS.1 and is used in other premises and the conclusion of the rule.

Method and Active Value code, a component of the Knowledge Base is in the form of LISP and provides interfacing to the Host Computer and the Expert System Shell. A set of LISP functions and a separate GENERIC-CLOCKS knowledge base are included to generate a real-time clock for synchronizing timer related functions in order to add the notion of timed events to the system. The GENERIC-CLOCKS knowledge base holds objects defining a real-time clock and controlling mechanisms to define the clock tick resolution and time scaling (provides a real-time rate or faster than real-time capabilities for simulation), and user interface shown in the Clock Mode Control window in FIG. 17. A set of LISP functions, active values and methods are also defined for clock operation.

The real-time clock uses the Host Computer System Clock and multi-processing facilities which execute a periodic real-time clock loop process. To handle a plurality of timers on a multitude SM position objects, a Timer Queue management facility is required and consists of a set of functions and processes to add, remove and access timers on a dynamic queue called the Timer Queue List (TQL). The TQL structure is illustrated in FIG. 16 where three timer entries have been added with a future timeout value as a tag for TQL tests. A set of TIMER.STATE.CHANGE demons and TIMER.-TIMEOUT Methods are defined to react to TQL changes to trigger events in the Expert System. The Real-Time Clock and Timer Service flow diagram, shown in FIG. 15, consists of three parts:

(1) a real-time clock loop process for maintaining the date and time 40;
(2) a timer queue test process to detect queued timer timeouts 41; and
(3) a timer timeout service process or active value to initiate timer events 42.

These function as follows:

(1) The real-time clock loop 40 runs every TIME-INCREMENT, or "N" seconds. the increment is a value in the GENERIC-CLOCKS knowledge base. The Host Computer suspends this process for the "N" second period, and then
(2) the Clock Tick Update Method is invoked which updates the current time and date in a real-time or faster than real-time mode for simulation, and
(3) passes control to .or activates the Test Timer Queue process 41 which examines the TQL for all timer entries that have timed out. The real-time clock loop then returns to an idle state until the next time interval has passed. When the timer queue test finds a timed out queue entry,
(4) the entry is removed from the TQL, the current time is logged in the timeout value slot of the timer entry's object, and the next state from the timer's entry is written to the timer state slot which causes
(5) an Active Value to be invoked which services the timeout state 42. The active value then sends a timeout message to the timer entry's Method which performs timer specific functions, unique to each timer in the expert system. The Method then
(6) causes a Timer Event Trigger by changing a value in the Fact Base or sending messages to other methods. When all TQL entries have been tested, the system waits for the next real-time clock interval to repeat the process.

An example of timer service is when a timer state slot, such as SM.11.POS.1's DOFF.TIMER slot is changed to START, causing an attached active value to run which adds a timer entry to the TQL including its future timeout value in Universal Date-Time format in seconds, the UNIT name "SM.11.POS.1", the SLOT name "DOFF.TIMER", a slot for the time at timeout or "DOFF.TIMER.METHOD", and the next state to be set on timeout or "TIMEOUT", as shown in FIG. 16. When this TQL entry is tested and found to be timed out, the timer service process will log the time in the DOFF.TIMER TIMEOUT slot and change the DOFF.TIMER slot to "TIMEOUT". This will, in turn, cause the TIMER.STATE.CHANGE.AV active value to run and react to the new TIMEOUT state value. The DOFF.TIMER.METHOD is sent a message, causing DOFF.TIMER specific actions to be performed. In this case the DOFF.TIMER will cause an Event by asserting a new fact in the Fact Base initiating forward chaining on the Rule Base.

Figure 17:
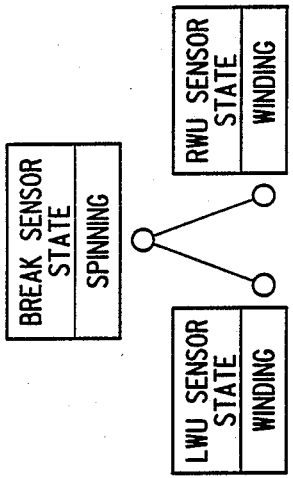
FIG. 17 is a representation of a typical CRT display of a position in the run state.

Other sets of functions, methods and active values are defined to perform specific I/O sequences, interfacing and housekeeping. For example, selection of a spinning machine position for CRT display as shown in FIG. 17 illustrates a graphical position display as would appear on a CRT, which interacts with the user via mouse sensitive graphical images tied to slots in the position selected by spinning machine position number. Active value functions update the display when the slots change and re-attach the graphic images to the new position unit.

Other functions exist as separate processes to perform stream I/O to communicate to the I/O front end subsystem and map specific sensor inputs to position unit input slots in the fact base. This serves as a sensor state change event trigger.

Figure 18:
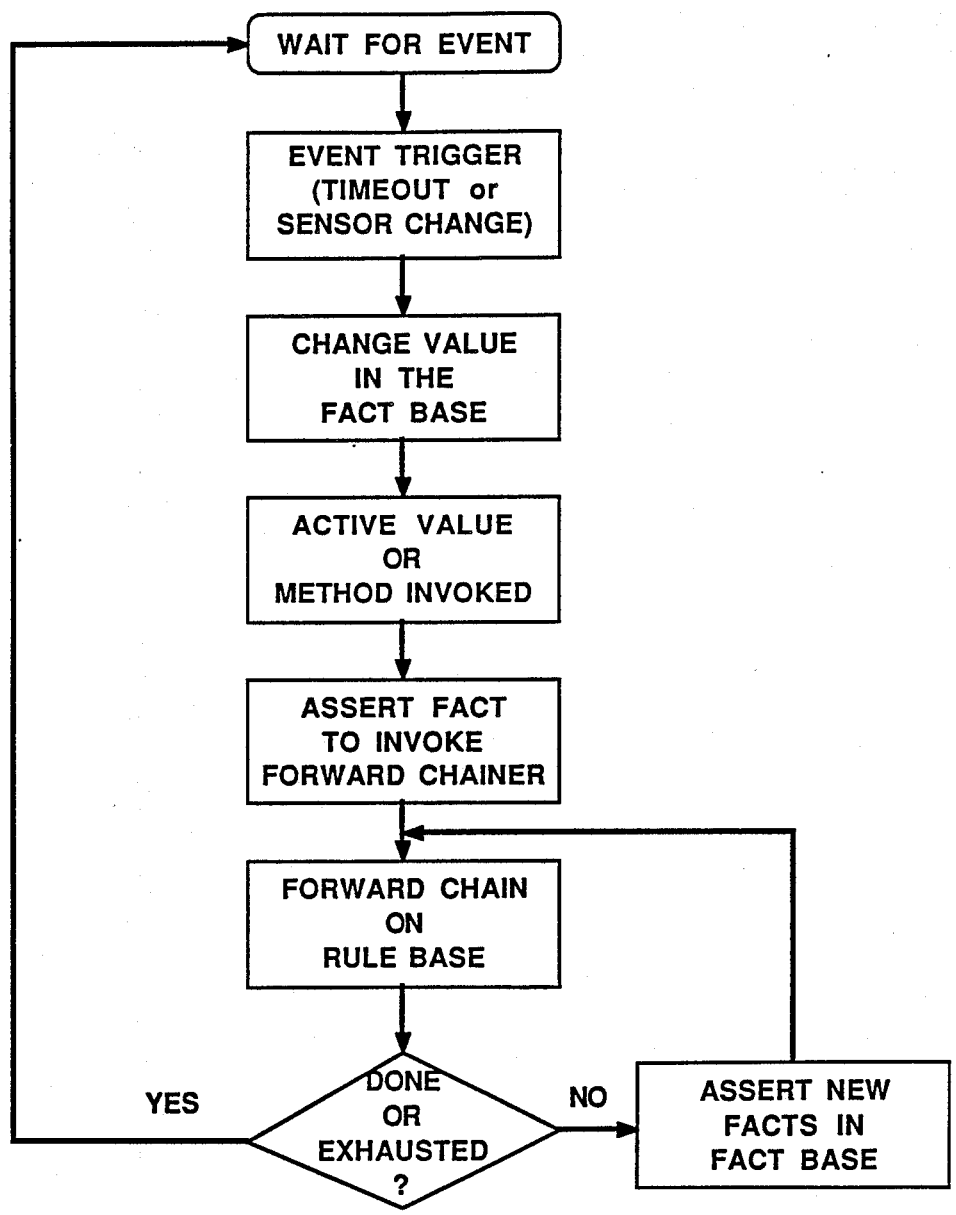
FIG. 18 is a logic block diagram of the general event processing algorithm.
Figure 19:
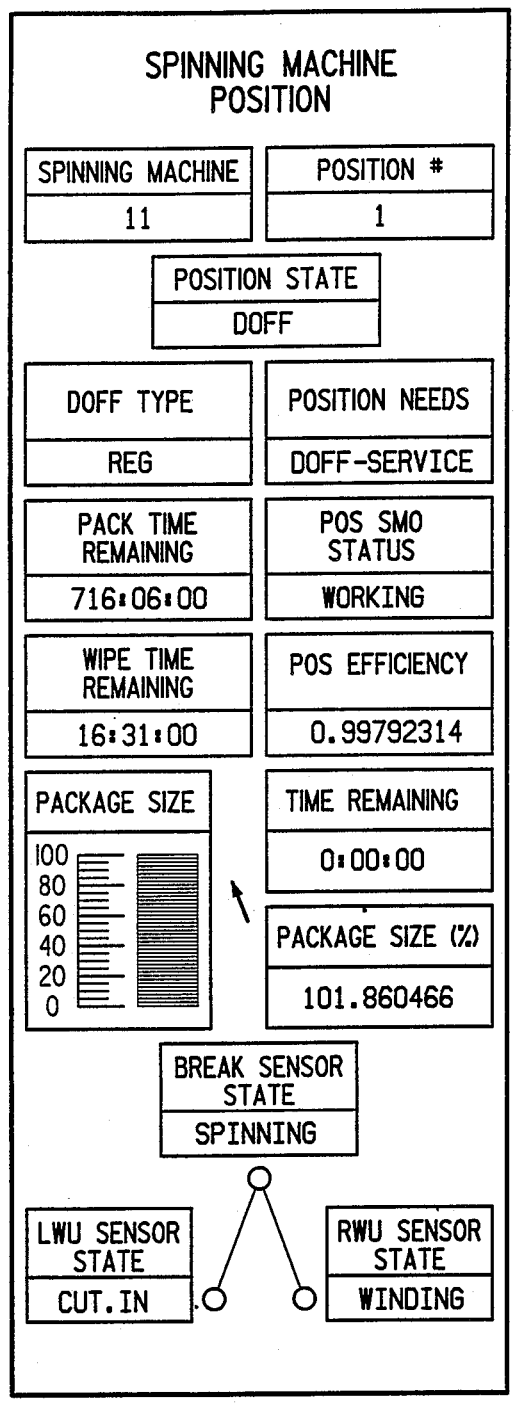
FIG. 19 is a representation of a typical screen display of a position in the doff state.

The general algorithm for processing events in the present invention is illustrated in FIG. 18. The event triggering mechanism works as follows:

(1) an event is triggered by either a change in a sensor input or a timer time-out on any position (or SMO) instance, and then (2) a fact in the fact base is changed. In the case of sensors, an I/O function changes the value of the sensor's input slot. For timers, the timer's state slot is changed to a TIMEOUT value. The change in value then causes (3) an active value to be invoked. For sensors, active values specific to each sensor are executed. For timers, a generic TIMER.STATE. CHANGE.ACTIVE.VALUE.LISP function is invoked which, in turn, sends a message to the timers' time-out method, another LISP function. The code invoked then (4) asserts a fact into the fact base to invoke forward chaining on a specified rule class. Forward chaining begins and (5) the forward chaining process continues by testing candidate rules that match the asserted facts and current facts in the fact base, applying the conclusions of the rules (changing facts in the fact base or performing other actions), and (6) continuing until no new rules can be tested or forward chaining is explicitly stopped.

New facts are asserted, retracted or changed and methods or active values may be invoked in the conclusions of rules to perform computations and other housekeeping functions. When the inferencing process has been completed, the updated fact base represents the actual operating state of all objects in the system, including SM's, Positions and SMO's.

EXAMPLE

This example describes the present invention's expert system response to three events occuring in the production of synthetic fibers as described above. The first event is a normal doff sequence; the second event is a threadline break. The latter illustrates the capability of the system to detect and react to abnormal spinning conditions. The third event is two sensor validation sequences where rules are used to detect a failing input. In the example it is assumed that SM.11.POS.1 is in the run state with all sensors in the on state as shown by FIG. 17. In the actual spinning environment, sensor states may change in different orders or simultaneously. For the purpose of illustration, sensors change sequentially.

A normal doff sequence "scheduled doffing" is an event requiring the SMO to doff a particular position upon lapse of a pre-selected time interval; e.g., when the package is full. In the practice of the present invention, a doff timer times out to schedule an available SMO to service (e.g., doff) the position. The expert system reacts to several events in a sequence. While in the RUN state, the position display in FIG. 17 indicates the time remaining until the DOFF.TIMER times out indicating the need for service, the relative package size and other position service information. The DOFF.TIMER on the TQL reaches its time-out value and the DOFF-.TIMER slot of SM.11 POS.1 is changed to TIME-OUT, keying a timer event. The TIMER-STATE-CHANGE-ACTIVE-VALUE is invoked which sends a message to the DOFF.TIMER.METHOD. The DOFF.TIMER.METHOD asserts the fact that the NEEDS of SM 11.POS.1 is DOFF-SERVICE and starts the forward chaining process on the rule base. The POSITION.WRT.SMO.RULES are tested, and the POS.STATUS of SM.11.POS.1 is changed to WAITING. The SMO.SCHEDULING.RULES are then chained on, and the next available SMO, TOM, is assigned to DOFF SM 11 POS.1, and forward chaining completes. The SMO is alerted and some time interval later, acknowledges the assignment, and forward chaining is invoked and the POSITION.WRT.SMO RULES are tested, and the SMO STATUS is changed to WORKING. The active value attached to the sensor input slot is invoked and asserts the fact that the LWU.-SENSOR is ON.TO.OFF and invokes forward chaining on the rule base. The POSITION.SENSOR.IO.-RULES in FIG. 12 are tested and the LWU.SENSOR-.ON.TO.OFF rule succeeds and is "fired". This starts the LWU.SENSOR.TIMER for a validation delay and forward chaining. On time-out, forward chaining is invoked and the LWU.SENSOR.ON rule is fired, chaining continues and the LWU.DOFF.COMPLETE rule is fired which starts the LWU.START.TIMER. Forward chaining completes and the system waits for the next event. Some time later, the SMO cuts in the Right windup which causes the RWU.SENSOR.IN-PUT to be changed from ON to OFF. As with the LWU.SENSOR.INPUT, the RWU.SENSOR.INPUT follows the same validation sequence, using the RWU.-SENSOR.ON.TO.OFF and RWU.SENSOR.OFF rules, and RWU.SENSOR.TIMER. When the RWU.-SENSOR.TIMER times out and invokes forward chaining, the RWU.SENSOR.OFF rule is fired and changes the RWU.SENSOR to the OFF state, the RWU.CUT.IN rule is fired changing the RWU.SEN-SOR.STATE to CUT.IN, and forward chaining completes. Asynchronously, the LWU.START.TIMER times out, forward chaining is invoked, and the LWU.-WINDING rule is fired and the LWU.SENSOR.-STATE is changed to WINDING. The SMO strings up the Right windup turning the RWU.SENSOR.INPUT ON. The validation process is completed and when the RWU.SENSOR is changed to ON, the RWU.DOFF-.COMPLETE rule is fired, the RWU.SENSOR.-STATE of SM.11.POS.1 is changed to DOFF.COMPLETE and the RWU.START.TIMER is started. When the RWU.START.TIMER times out, forward chaining is invoked and the RWU.WINDING rule is fired changing the RWU.SENSOR.STATE of SM.11.POS.1 to WINDING. The POS.STATE.RUN rule is fired, since both the LWU.SENSOR.STATE and RWU.SENSOR.STATE are WINDING, and the STATE of SM.11.POS.1 is changed to RUN. The DOFF.TIMER and OVERSPIN.TIMER are started for the next cycle, and the NEEDS of SM.11.POS.1 is changed to NO-SERVICE. The POSITION.WRT.SMO.RULES are tested and the SMO.STATUS of SM.11.POS.1 is changed to DONE, reflecting the completion of the task by the SMO. The SMO is then de-assigned from SM.11.POS.1 and the SMO.STATUS is changed to IDLE. The fact base now reflects the running state of the position and IDLE state of the SMO.

The next example event is a threadline break requiring "unscheduled doffing". Normally, such a break would cause costly waste of yarn. In the practice of the present invention, the expert system detects the break and informs the SMO in a timely fashion to minimize waste. It is assumed that SM.11.POS.1 begins in the RUN state as shown in FIG. 17. A threadline break occurs which changes the BREAK.SENSOR.INPUT from ON to OFF. After the validation delay and test sequence described above, the BREAK.SENSOR of SM.11.POS.1 is changed from ON.TO.OFF to OFF by the BREAK.SENSOR. OFF rule, queuing the BREAK.SENSOR.BREAK rule. The BREAK.SENSOR.STATE is changed from SPINNING to BREAK which causes the POS.STATE.DOWN rule to be fired. This in turn changs the STATE of SM.11.POS.1 from RUN to DOWN and the NEEDS slot to MAINTENANCE. Forward chaining continues and the POS.STATE.CHANGE and POS.STATE.OUT.OF.RUN rules are fired. The POSITION.WRT.SMO.RULES are tested and the SMO.STATUS of SM.11.POS.1 is changed from IDLE to WAITING. The SMO.SCHEDULING.RULES are tested, and the next SMO, DICK, is assigned to work on SM.11.POS.1, completing the chaining process. The next event then occurs as the LWU.SENSOR.INPUT changes from ON to OFF. The process described above for the LWU sensor is repeated and the LWU.SENSOR.STATE is changed to CUT.IN. The RWU.SENSOR.INPUT then changes to the OFF state, and similarly, the RWU.SENSOR.STATE is changed to CUT.IN. The SMO acknowledges the assignment some time later, and the SMO.STATUS of SM.11.POS.1 is changed to WORKING. FIG. 20 now reflects the state of SM.11 POS.1 in the DOWN state. Some time later, the SMO begins to string up the position and the BREAK.SENSOR.INPUT is changed from OFF to ON. After a validation delay, the BREAK.SENSOR is changed from BREAK to SPINNING by the BREAK.SENSOR.SPINNING rule. The SMO then strings up the windups as described above and the position is restored to the RUN state.

The third example event is the detection of a sensor or I/O signal failure. Again, assume that SM.11.POS.1 begins in the RUN state as shown in FIG. 17. Now suppose that the position goes into the DOWN state when the BREAK.SENSOR.INPUT goes from ON to OFF. The SMO assigned then strings up the position, but the break sensor fails to turn to the ON state. In this case, after the SMO strings up the left and right wind-ups, the BREAK.SENSOR.STATE will be BREAK, the LWU.SENSOR. STATE and RWU.SENSOR.STATE will both be DOFF. COMPLETE. When the RWU.START TIMER times out, forward chaining is started, and this time the BREAK.SENSOR.BAD.OFF rule in the POSITION.SENSOR. VALIDATION RULES of FIG. 12B is fired and the BREAK.SENSOR.CONDITION is changed from GOOD to BAD. This causes the BAD.SENSOR.ALERT rule to fire which alerts the SMO. In the case of the break sensor, the heuristics have been developed such that the LWU and RWU sensors can be used in combination to infer the state of the Position, as illustrated by the BREAK.SENSOR.SPINNING and BREAK.SENSOR.BREAK rules in FIG. 12A.

Figure 21:
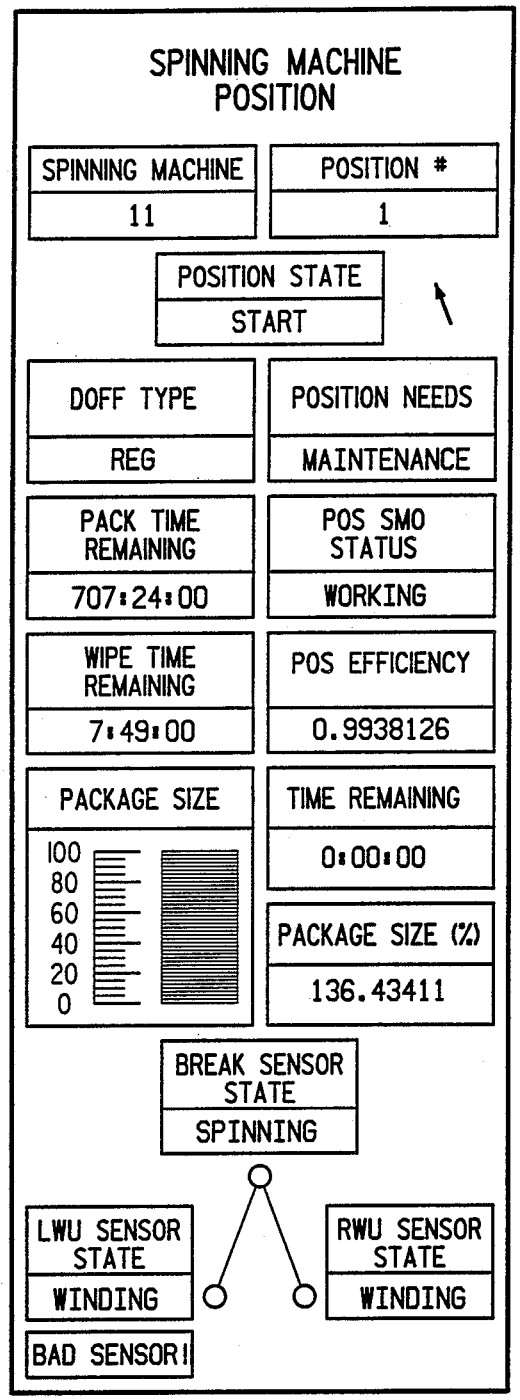
FIG. 21 is a representation of a typical screen display of a position display in the START state after a LWU sensor failure event.

As a final illustration of sensor validation, assume that SM.11.POS.1 is in the RUN state as in FIG. 17, and that the LWU sensor or I/O signal has failed and remains in the ON State. In this case, the DOFF.TIMER will time out and an SMO will be assigned to service the position. When the SMO cuts in the Left windup, the sensor fails to change state. When the position last went into the RUN state during the previous doff, the OVERSPIN TIMER was started, which will time out after the DOFF.TIMER times out, should a cut-in fail to occur or be detected. When the OVERSPIN.TIMER times out, forward chaining is invoked and the LWU.SENSOR.BAD.ON rule fires and the LWU.SENSOR.CONDITION is changed from GOOD to BAD. The BAD.SENSOR.ALERT rule is fired alerting the SMO that maintenance is required. The BAD.SENSOR.STATE.CHANGE rule is fired changing the STATE of SM.11.POS.1 from RUN to START as shown in FIG. 21. Some time after the assigned SMO then breaks the position down, and the STATE is changed to DOWN. The SMO repairs and tests the sensor and strings up the position as before. The heuristics developed require that proper operation of the LWU sensor be maintained and immediate attention be given when a failure is detected.

We claim:

1. A method for monitoring the operation of a multi-position spinning machine wherein filaments are extruded from a spinning pack at each position and advanced as a yarn bundle in a path, then split at a location into a plurality of threadlines to be forwarded to a plurality of windups to be wound on packages, and scheduling events at predetermined times in the preparation of said packages with the aid of a digital computer, said method comprising:

(a) providing said computer with a knowledge database that includes the operative state of each position, the elapsed time since the initiation of each package, predetermined event times unique to the filaments being wound, the positional configuration of said machine, and a hueristic rule base;

(b) sensing the operative state of each position by monitoring the presence or absence of the advancing yarn bundle and said threadlines as a function of time;

(c) providing the computer with the operative status of each position as sensed in step (b) and the elapsed time since the initiation of each package of the position;

(d) comparing in the computer the operative state of each position and the elapsed time since initiation of each package of said position with predetermined event times and said hueristic rule base; and (e) performing said events on said spinning machine when said computer indicates that the time for performing said events has been reached.

2. The method of claim 1, wherein said state of each position is sensed by a plurality of sensors and the validation status of each sensor is constantly provided to the computer.

3. A system for monitoring the operation of a multi-position spinning machine wherein filaments are extruded from a spinning pack at each position and advanced as a yarn bundle in a path, then split at a location into a plurality of threadlines to be forwarded to a plurality of windups to be wound on packages and scheduling events at predetermined times in the preparation of said packages with the aid of a digital computer, said system comprising:

(a) means for providing said computer with a knowledge database that includes the operative state of each position, the elapsed time since the initiation of each package, predetermined event times unique to the filaments being wound, the positional configuration of said machine, and a hueristic rule base;

(b) means for sensing the operative sate of each position by monitoring the presence or absence of the advancing yarn bundle and said threadlines as a function of time;

(c) means for providing the computer with the operative status of each position as sensed in step (b) and the elapsed time since the initiation of each package of the position;

(d) means for comparing in the computer the operative state of each position and the elapsed time since initiation of each package of said position with predetermined event times and said hueristic rule base; and (e) means for indicating that the time for performing said events has been reached.

4. The system according to claim 3 including means for validating the status of each means for sensing the operative state of each position.

* * * * *